United States Patent [19]

Fulukawa et al.

[11] 4,225,894
[45] Sep. 30, 1980

[54] MODE CHANGE-OVER MECHANISM FOR RECORDING AND/OR REPRODUCING APPARATUS

[75] Inventors: Takumi Fulukawa, Yamato; Hisashi Hanzawa; Kunio Shimizu, both of Tokyo, all of Japan

[73] Assignee: Sony Corporation, Tokyo, Japan

[21] Appl. No.: 961,960

[22] Filed: Nov. 20, 1978

[30] Foreign Application Priority Data

Nov. 19, 1977 [JP] Japan ................................ 52-139225

[51] Int. Cl.$^2$ ...................... G11B 15/02; G11B 19/02
[52] U.S. Cl. ..................................... 360/137; 360/61; 360/69; 360/74.1; 360/96.3
[58] Field of Search .......................... 360/137, 73–74, 360/96.3, 60–62, 69

[56] References Cited

U.S. PATENT DOCUMENTS

| 3,765,685 | 10/1973 | Harlan et al. ............... 360/62 X |
| 4,021,854 | 5/1977 | Saito ............................ 360/137 X |
| 4,130,843 | 12/1978 | Miyamoto et al. ............. 360/62 |

Primary Examiner—John H. Wolff
Attorney, Agent, or Firm—Lewis H. Eslinger; Alvin Sinderbrand

[57] ABSTRACT

A mode change-over mechanism for a recording and/or reproducing apparatus comprises a drive gear which is effective to drive a cam gear upon the release, by energizing of at least one of a plurality of electro-magnets, of a stopper for the cam gear so that a cam on the latter can effect a longitudinal displacement, in one direction, of a detecting slide which is thereafter spring urged to return to an original position, a plurality of selecting slides individually movable in response to energizing of respective ones of the electro-magnets for selectively limiting the return movement of the detecting slide toward the original position, mode establishing slides individually displaceable for changing-over the apparatus into respective operating modes thereof, a mode change-over lever positionable by the detecting slide for coupling with a selected one of the mode establishing slides in response to the selective limitation of the return movement of the detecting slide toward its original position, and a drive assembly adapted to be powered from the drive gear for effecting a drive stroke of the mode change-over lever and thereby displacing the mode establishing slide with which the mode change-over lever has been coupled.

21 Claims, 17 Drawing Figures

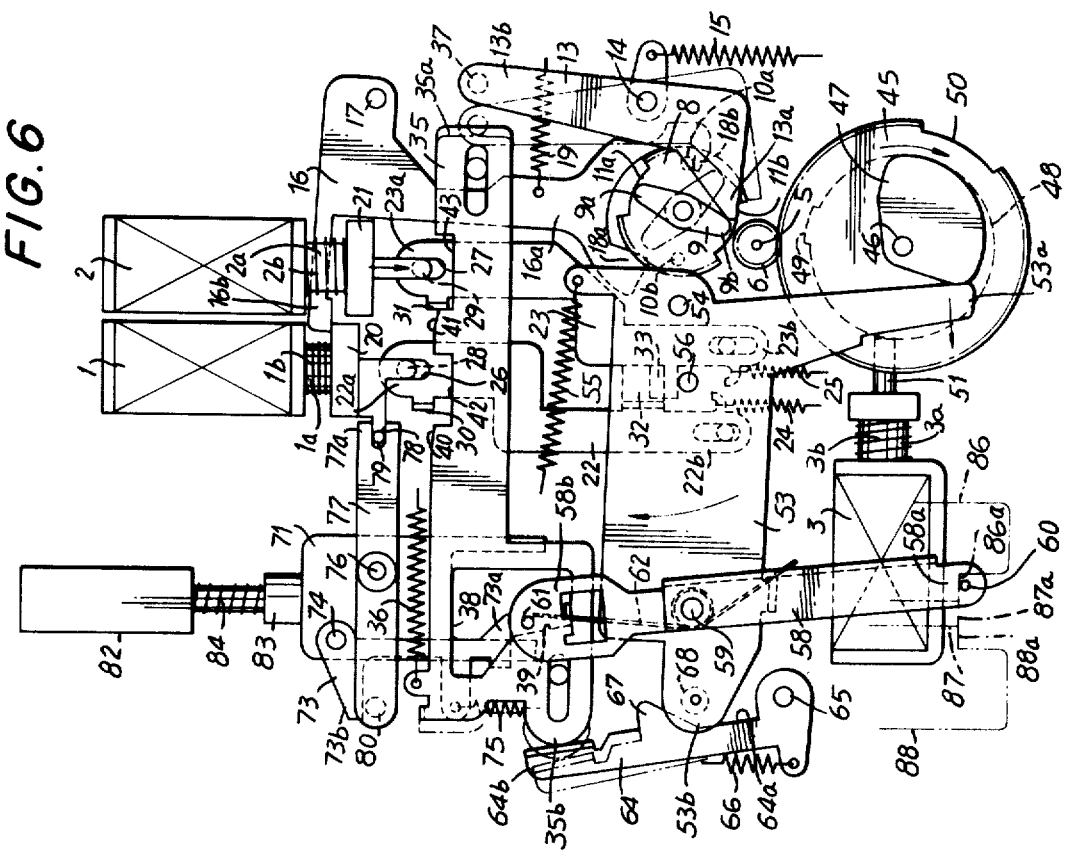

MODE CHANGE-OVER MECHANISM FOR RECORDING AND/OR REPRODUCING APPARATUS

BACKGROUND OF THE INVENTION

1. Field of the Invention

This invention relates generally to a recording and/or reproducing apparatus, and more particularly is directed to improvements in the mode change-over mechanism of a recording and/or reproducing apparatus, such as an audio tape recorder or a video tape recorder (VTR).

2. Description of the Prior Art

Mode change-over mechanisms of the feather-touch type have been proposed for recording and/or reproducing apparatus in which a push button or mode selecting switch of the feather-touch type can be softly touched to energize plunger-solenoids for the change-over operation to a desired mode. However, in all of the proposed mode change-over mechanisms, the pulling forces generated by the plunger solenoids themselves are used to operate or displace substantially all of the parts, such as levers and sliding members, that need to be moved for the mode change-over operation. Accordingly, the plunger-solenoids have to be provided with large capacities. Further, in most of the proposed mode change-over mechanisms, the energization of the plunger-solenoids has to be maintained even after the end of a respective mode change-over operation, so that such a recording and/or reproducing apparatus consumes much electric power, as is unsuitable for battery operation.

Moreover, none of the existing mode change-over mechanisms can perform a so-called "mutual mode change-over operation" in which the tape recorder can be changed over to one of the forward (FWD) mode, the recording (REC) mode, the fast-forward (FF) mode and the rewind (REW) mode directly from another of such modes, that is, without passing through the STOP mode. Thus, the flexibility of operating mode selection in the existing tape recorders is not all that would be desired, particularly for dictation or editing purposes.

SUMMARY OF THE INVENTION

An object of this invention is to provide a recording and/or reproducing apparatus which overcomes the above-described defects of the conventional recording and/or reproducing apparatus.

Another object of this invention is to provide a recording and/or reproducing apparatus in which plunger solenoids of relatively small capacity, and hence of relatively small size and mass, can be used in the mode change-over mechanism.

A further object of this invention is to provide a recording and/or reproducing apparatus, as aforesaid, in which the consumption of electric power can be greatly reduced.

A still further object of this invention is to provide a recording and/or reproducing apparatus which can perform the so-called "mutual mode change-over operation".

A still further object of this invention is to provide a recording and/or reproducing apparatus which provides superior operating flexibility.

A still further object of this invention is to provide a recording and/or reproducing apparatus with a mode change-over mechanism, as aforesaid, and in which a relatively small number of plunger-solenoids are required in such mechanism.

In accordance with an aspect of this invention, a mode change-over mechanism for a recording and/or reproducing apparatus includes a drive gear which is effective to drive a cam gear upon the release of a latch or stopper by energizing at least one of a plurality of electro-magnets so that a cam on the cam gear can effect a longitudinal displacement, in one direction, of a detecting slide which is thereafter spring urged to return to an original position, a plurality of selecting slides individually movable in response to energizing of respective ones of the electro-magnets for selectively limiting the return movement of the detecting slide toward its original position, mode establishing slides individually displaceable for changing-over the apparatus into respective operating modes thereof, a mode change-over lever positionable by the detecting slide for coupling with a selected one of the mode establishing slides in response to the selective limitation of the return movement of the detecting slide toward its original position, and drive means, for example, a radial cam adapted to be driven from the drive gear for effecting angular reciprocation of a drive lever on which the mode change-over lever is mounted, to impart a drive stroke to the mode changeover lever and thereby displace the mode establishing slide with which the mode change-over lever has been coupled.

The above, and other objects, advantages and features of the invention, will become readily apparent from the ensuing detailed description which is to be read in connection with the accompanying drawings.

BRIEF DESCRIPTION OF THE DRAWINGS

FIGS. 5 to 7 are views similar to that of FIG. 1, but illustrating successive phases in the mode change-over operation to the FWD mode of the tape recorder;

DESCRIPTION OF THE PREFERRED EMBODIMENTS

Figure 2:
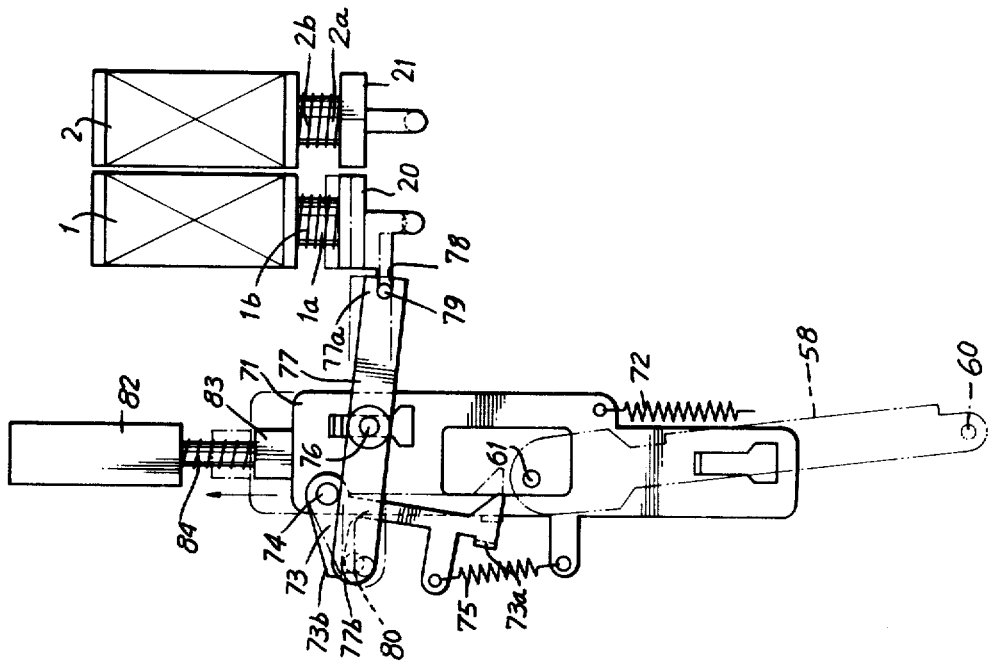
FIG. 2 is a plan view of a recording/reproducing change-over part of the tape recorder of FIG. 1.

A mode change-over mechanism according to an embodiment of this invention which is adapted for a cassette-type tape recorder will now be described with reference to the drawings from which upper and lower chassis actually provided in the tape recorder, are detected for simplification of the drawings. A tape drive mechanism of the tape recorder which conventionally includes a capstan, a pair of reel mounts, idlers and an electric motor, is arranged on the upper chassis, and the mode change-over mechanism to be described hereinafter in detail is arranged on the lower chassis.

Further, five mode-selecting switches (not shown), namely a forward (FWD) switch, a record (REC) switch, a fast-forward (FF) switch, a rewind (REW) switch and a stop switch, which are, actuable by respective push-buttons, for example, of the feather-touch type or the touch type, are provided to change over the tape recorder into respective operating modes.

Construction of the mode change-over mechanism arranged on the lower chassis will be described in detail with reference to FIGS. 1-3.

Plunger-solenoids 1, 2 and 3 are provided to be selectively energized in predetermined combinations in response to selective actuation of any one of the five mode-selecting switches for establishing the respective desired operating mode. Rods or armatures 1a, 2a and 3a of the plunger-solenoids 1, 2 and 3 are magnetically pulled or retracted against the force of restoring springs 1b, 2b and 3b upon energization of the respective plunger-solenoids 1, 2 and 3.

A capstan shaft 5 is adapted to be driven by an electric motor (not shown). Whenever any one of the mode-selecting switches, except the stop switch, is selectively actuated, electric power is suitably supplied to the tape recorder, and the mentioned electric motor is energized to rotate capstan shaft 5.

A drive gear 6 is fixed on capstan shaft 5, and a cam gear 8 is rotatably arranged at one side of drive gear 6. A rotary cam 9 is integrally formed on the upper surface of cam gear 8, and a pair of diametrically opposed pins 10a and 10b depend integrally from the lower surface of cam gear 8. Two toothless portions or gaps 11a and 11b are provided at diametrically opposed locations on gear 8 which is rotatable on a central shaft 12. A generally L-shaped transmission lever 13 is pivotally supported at its central portion on a pivot pin 14. The transmission lever 13 is urged in the clockwise direction about pin 14 (FIG. 1) by a spring 15 so that one end portion 9a of rotary cam 9 is pushed by an end 13a of transmission lever 13 for urging gear 8 in the clockwise direction from the position shown on FIG. 1.

Further, a generally L-shaped starting lever 16 having arms 16a and 16b is pivotally supported at its corner on a pivot pin 17. A pair of curved, bifurcated extensions 18a and 18b of arm 16a of the starting lever 16 extend under cam gear 8. When starting lever 16 pivots about pin 17, the curved extensions 18a and 18b are alternately interposed in the rotary path of pins 10a and 10b depending from the lower surface of cam gear 8. The end portion of the curved extension 18b is shown particularly on FIG. 3 to be in the form of hook. The starting lever 16 is urged in the counter-clockwise direction (FIG. 1) by a spring 19. The plunger-solenoids 1 and 2 are arranged with their axes parallel and adjacent to each other. Contact blocks 20 and 21 are fixed to the ends of the armatures or rods 1a and 1b of plunger-solenoids 1 and 2, respectively. The arm 16b of starting lever 16 is adapted to contact both contact block 20 of plunger-solenoid 1 and contact block 21 of plunger-solenoid 2.

A pair of selecting slides 22 ad 23 are arranged generally parallel to each other adjacent to plunger-solenoids 1 and 2. The slides 22 and 23 are each in the form of crank so as to have offset end portions 22a, 22b and 23a, 23b, respectively, in which oblong openings 26 and 27, respectively, are formed. The slides 22 and 23 are slidably guided in their length-wise directions by means of guide pins slidably received in oblong openings 26 and 27 and they are urged downwards, as viewed on FIG. 1, by springs 24 and 25, respectively. More particularly, openings 26 and 27 in end portions 22a and 23a of selecting slides 22 and 23 respectively receive pins 28 and 29 formed integrally with the contact blocks 20 and 21, and the free ends of the pins 28 and 29 are preferably inserted in oblong openings (not shown) formed in the chassis, so as to be guided thereby. Tabs 30 and 31 are formed integrally with end portions 22a and 23a of selecting slides 22 and 23 and bent upwardly from the latter. Other tabs 32 and 33 are formed integrally with the other end portions 22b and 23b, respectively, of selecting slides 22 and 23 and extend laterally from the latter so as to overlap each other, as clearly shown on FIG. 3.

A detecting slide 35 is extended laterally over selecting slides 22 and 23, with the lengthwise direction of detecting slide 35 being substantially perpendicular to the lengthwise directions of selecting slides 22 and 23. Detecting slide 35 is designed to be slidably guided in its lengthwise direction by means of oblong openings 35c formed in its end portions 35a and 35b and slidably receiving guide pins 35d, and slide 35 is urged toward the right, as viewed on FIG. 1, by a spring 36. A pin 37 is formed integrally with an end portion 13b of transmission lever 13 remote from end 13a, and is engageable against the end edge of end portion 35a of detecting slide 35. An opening 38 is formed in the other end portion 35b of detecting slide 35 so as to have an angled pin-guide edge 39. A pair of projections 40 and 41, and a pair of adjacent recesses 42 and 43, respectively, are formed in one side edge 35e of detecting slide 35, for cooperation with tabs 30 and 31 of selecting slides 22 and 23, respectively, as hereinafter described.

A second cam gear 45 is arranged adjacent to drive gear 6 at the side of the latter opposite to the firstmentioned cam gear 8. A radial cam 47 is formed integrally with the upper surface of the cam gear 45, and is eccentric with respect to a shaft 46 about which cam gear 45 is rotatable. A circular projection or boss 48 concentric with rotary shaft 46 is formed integrally with the lower surface of cam gear 45, and a radial projection 49 extends from the periphery of circular projection 48. A single toothless portion or gap 50 is formed in the toothed periphery of cam gear 45.

The plunger-solenoid 3 is disposed apart from plunger-solenoids 1 and 2. A pin 51 is fixed to the end of rod or armature 3a of plunger-solenoid 3 and is softly pressed against the peripheral surface of circular projection 48 of the cam gear 45 by the respective restoring spring 3b.

Figure 1:
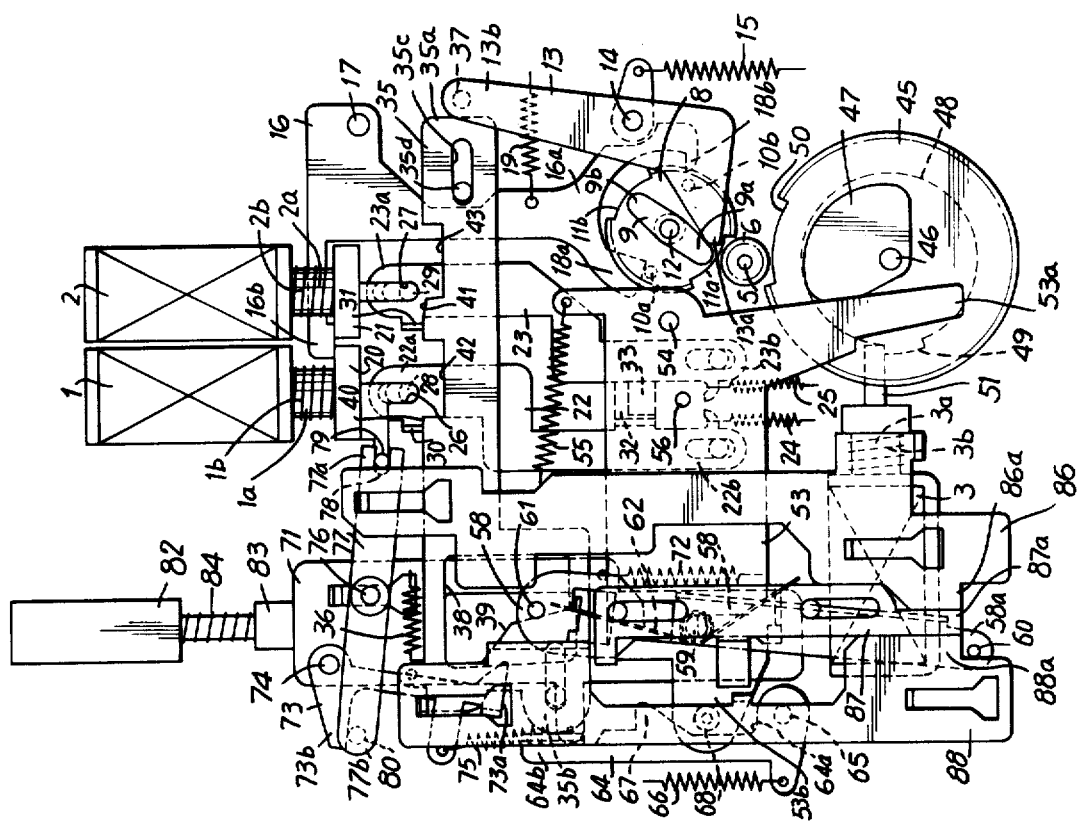
FIG. 1 is a plan view of a tape recorder according to one embodiment of this invention, and which is shown in its STOP mode.

A generally L-shaped drive lever 53 is rotatably supported on a support pin 54, and is urged in the counter-clockwise direction, as viewed on FIG. 1, by a spring 55. One end portion 53a of drive lever 53 is pressed against the perpheral surface of eccentric radial cam 47 by the action of spring 55. The pin 56 depends from drive lever 53 substantially at the central portion of the latter, and is engageable concurrently with tabs 32 and 33 of selecting slides 22 and 23 (FIG. 1).

A mode change-over lever 58 is arranged over another end portion 53b of drive lever 53, and is pivotally supported, at its central portion, on a pivot pin 59 carried by drive lever 53. A mode change-over pin 60 is directed upwardly from one end portion 58a of mode change-over lever 58, and a pin 61 depends from the opposite end portion 58b of lever 58 and is received in opening 38 of detecting slide 35. A torsion spring 62 is wound on pivot pin 59, and has its opposite ends engaged with drive lever 53 and mode change-over lever 58 at the respective tab portion. Accordingly, mode change-over lever 58 is urged in the counter-clockwise direction (FIG. 1) relative to drive lever 53 about pin 59 by the action of torsion spring 62, so that the pin 61 of mode change-over lever 58 is pressed against pin-guide edge 39 of opening 38.

A lock lever 64 is pivotally supported on a fixed support pin 65 at the side of mode change-over lever 58. Lock lever 64 is urged in the clockwise direction, as viewed on FIG. 1, by a spring 66. A lateral triangular projection 67 from the side edge 64a of lock lever 64 which is directed toward the adjacent end portion 53b of the drive lever. A pin 68 is directed downwardly from end portion 53b of the drive lever 53, and is designed to be engageable with lateral triangular projection 67. An end portion 64b of lock lever 64 is pressed against end portion 35b of detecting slide 35, as clearly shown on FIG. 5, by the action of spring 66 on lever 64.

Figure 3:
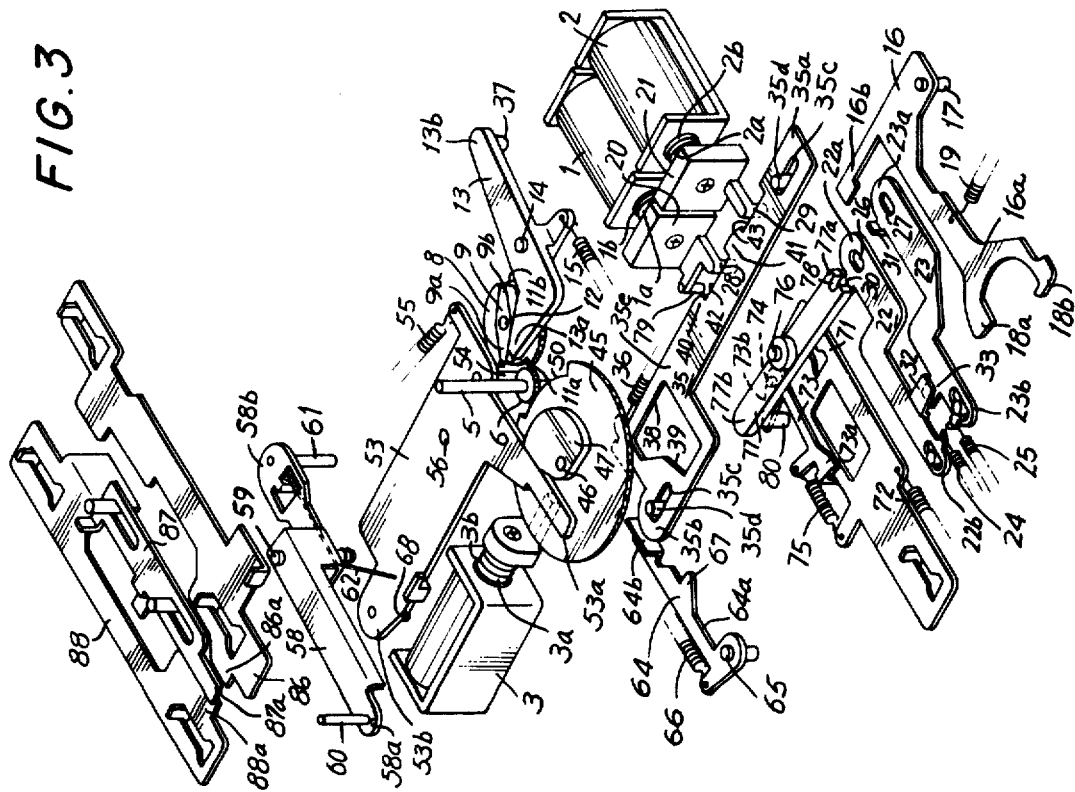
FIG. 3 is an exploded perspective view of a portion of the tape recorder of FIG. 1.

A reproducing/recording change-over slide 71 is slidably guided in its lengthwise direction by means of oblong openings and guide pins fitted into the latter, and it is urged, in the downward direction, as viewed on FIGS. 1 and 2, by a spring 72. A reproducing/recording selection lever 73 is pivoted on a pin 74 fixed to reproducing/recording change-over slide 71, and lever 73 is urged in the counter-clockwise direction, as viewed on FIG. 2, by a spring 75 extending between lever 73 and reproducing/recording change-over slide 71. When reproducing/recording selection lever 73 swings about pin 74, an end portion 73a of lever 73 is projected into the path of movement of pin 61 on mode change-over lever 58, as shown by the dot-dash line on FIG. 2, or is withdrawn from such path of movement of pin 61, as shown by full lines. A transmission lever 77 is arranged above reproducing/recording change-over slide 71, and is pivotally supported at its central portion on a fixed pivot pin 76. A recess 78 is formed in one end 77a of transmission lever 77 and receives a pin 79 formed integrally with contact block 20 of plunger-solenoid 1. A pin 80 depends integrally from the lower surface of the other end 77b of transmission lever 77, and an end portion 73b of reproducing/recording selection lever 73 pushes pin 80 of transmission lever 77 downwardly, as viewed on FIG. 2, in response to the action of spring 75 on lever 73.

A recording/reproducing change-over switch 82 is provided for selectively changing over recording/reproducing circuits of the tape recorder into the recording mode or reproducing mode, and such switch 82 is actuated by the recording/reproducing change-over slide 71. More particularly, when recording/reproducing change-over slide 71 is displaced to the position shown by the dot-dash line in FIG. 2, an actuating element 83 of recording/reproducing change-over switch 82 is pushed by the adjacent end of slide 71 to change over the recording/reproducing circuits of the tape recorder into the recording mode. Conversely, when recording/reproducing change-over slide 71 is returned to its original position shown by the solid line on FIG. 2, actuating element 83 of recording/reproducing change-over switch 82 is restored to its original position by a spring 84 to change over the recording/reproducing circuits of the tape recorder into the reproducing mode.

A FWD slide 86, a FF slide 87 and a REW slide 88 are arranged parallel, and adjacent to each other under the upper chassis (not shown). The slides 86, 87, 88 are slidably guided for movements in their lengthwise directions by means of oblong openings and guide pins inserted into the latter. The FWD slide 86, the FF slide 87 and the REW slide 88 are respectively interlocked with conventional forward, fast forward and rewind drive systems (all not shown), of the tape drive mechanism arranged on the upper chassis. When a selected one of slides 86, 87 and 88 is displaced in the upward direction as viewed on FIG. 1, the tape drive mechanism of the tape recorder is selectively changed over into its FWD mode, FF mode or REW mode, respectively. The three slides 86, 87 and 88 are slidably returned to their original positions shown in FIG. 1 for the return of the corresponding drive systems to their original or inoperative conditions, respectively.

The mode change-over pin 60 fixed on end 58a of mode change-over lever 58 is adapted to face a selected one of end portions 86a, 87a and 88a of slides 86, 87 and 88, respectively, as clearly shown on FIG. 1. The end portions 86a and 88a are shown to be stepped, while end portion 87a has a straight edge. In mode change-over operations to be described hereinafter, the mode change-over pin 60 is selectively engaged with one of the end portions 86a, 87a and 88a of slides 86, 87 and 88, respectively, to push the selected slide 86, 87 or 88 the upward direction as viewed on FIG. 1, and thereby to change over the tape recorder to the respective desired mode.

Operations of the above described mode change-over mechanism will now be described:

First, a main feature of operation of this mode change-over mechanism will be described with reference to FIG. 4. In accordance with such operating feature, detecting slide 35 is moved back and forth through a stroke $S_1$ between its original position $P_1$, shown in dotted lines, and its forward position $P_2$, shown in two-dot dash lines. The forward movement of detecting slide 35 in the direction of an arrow a is accomplished by cam gear 8 and transmission lever 13 against the force of spring 36, and the backward movement of detecting slide 35 in the direction of an arrow b is accomplished by the action of spring 36. When detecting slide 35 is moved backward in the direction of arrow b from the forward position $P_2$, a stop position of the detecting slide 35 is determined by selecting slide 22 or 23. In dependence on the position of detecting slide 35, the mode change-over pin 60 of mode change-over lever 58 is set in a FWD position A, a FF position B or a REW position C. After the position of mode change-over pin 60 has been set, mode change-over lever 58 is driven longitudinally, in the direction of an arrow c, by drive lever 53, so that a selected one of the FWD slide 86, FF slide 87 and REW slide 88 is pushed in the same direction, that is, upward as viewed on FIG. 1, to change over the tape recorder to the corresponding mode. In the change-over to the recording mode, recording/reproducing change-over switch 82 (FIG. 8) is actuated by slide 71 to its recording condition, while FWD slide 86 is pushed longitudinally by mode changeover pin 60. When either the FWD mode, REC mode or REW mode is obtained, drive lever 53 is locked in its operative position by lock lever 64. When the tape recorder is changed over from the FWD mode, REC mode, FF mode or REW mode to the STOP mode, detecting slide 35 is again moved back and forth to release drive lever 53 from lock lever 64, so that drive lever 53 is free to be angularly returned to its original position.

Next, there will be described the operation of the mechanism in selecting the stop position of detecting slide 35.

Figure 4:
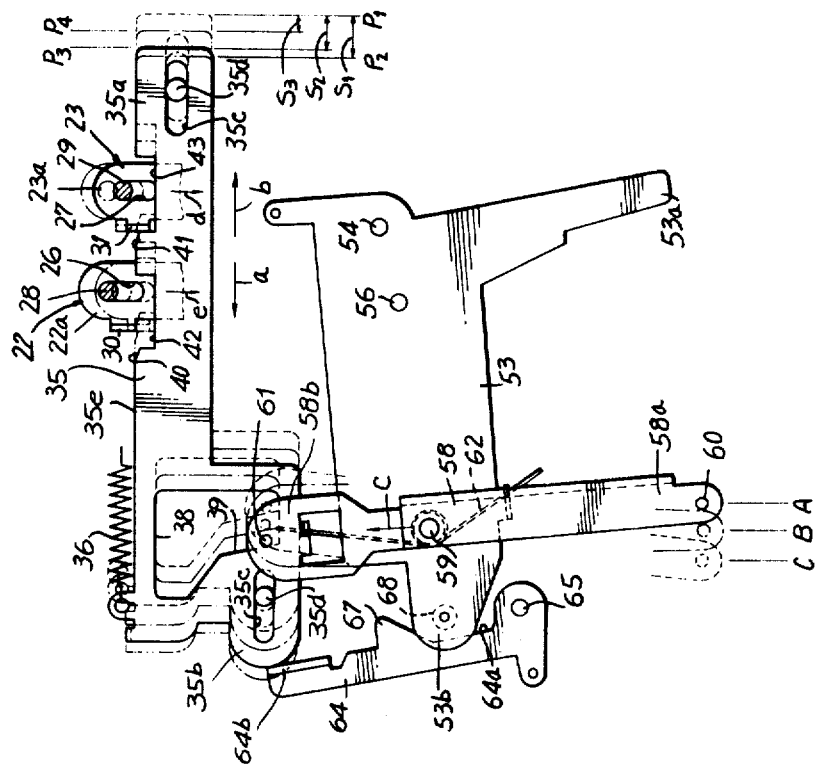
FIG. 4 is a plan view for illustrating a main operation in effecting a mode change-over of the tape recorder of FIG. 1.

In the change-over to the FWD mode, during which detecting slide 35 is displaced by stroke $S_2$ from the original position $P_1$ in the direction of arrow a on FIG. 4, selecting slide 23 moves in the direction shown by the arrow d, and its tab 31 moves from projection 41 of detecting slide 35 into the recess 43 of the latter. Detecting slide 35 is further slidably displaced to the forward position $P_2$, and then displaced backwardly, that is, in the direction of the arrow b. When detecting slide 35 reaches the position $P_3$ shown by the solid line on FIG. 4, tab 31 of selecting slide 23 collides with the side edge of projection 41, and thereby detecting slide 35 is arrested at the position $P_3$.

In the change-over to the FF mode, when the detecting slide 35 is slidably displaced by stroke $S_3$ from the original position $P_1$ in the direction of arrow a, selecting slide 22 moves in the direction of the arrow e, and its tab 30 moves from projection 40 of detecting slide 35 into recess 42 thereof. Detecting slide 35 is further slidably displaced forward to forward position $P_2$, and then backward in the direction of arrow b to the position $P_4$ in which the detecting slide 35 is shown by the dot-dash line. Upon the backward movement of slide 35 to position $P_4$, tab 30 of selecting slide 22 collides with the side edge of projection 40, and thereby detecting slide 35 is arrested at position $P_4$.

In the change-over to the REW mode, selecting slides 22 and 23 are held at their respective upper positions against the forces of springs 24 and 25 by plunger solenoids 1 and 2. Accordingly, detecting slide 35 is not stopped or arrested intermediate the forward position $P_2$ and the original position $P_1$ and, after detecting slide 35 reaches the forward position $P_2$, it is moved fully back to the original position $P_1$, and there stopped.

On the other hand, mode change-over lever 58 disposed above drive lever 53 is urged in the counter-clockwise direction about its pivot pin 59 by torsion spring 62 and, therefore, pin-guide edge 39 of opening 38 in detecting slide 35 is pressed against by pin 61 on mode change-over lever 58. Accordingly, with the above-described forward and backward movement of detecting slide 35, mode change-over lever 58 similarly swings back and forth. When detecting slide 35 is stopped or arrested at position $P_3$, mode change-over pin 60 on lever 58 is stopped at FWD position A. When detecting slide 35 is stopped at position $P_4$, mode change-over pin 60 on lever 58 is stopped at FF position B. When detecting slide 35 is stopped at position $P_1$, mode change-over pin 60 of lever 58 is stopped at REW position C.

Next, the various mode change-over operations of the tape recorder will be described with reference to FIGS. 5 to 11. When the previously-mentioned FWD switch, REC switch, FF switch, REW switch or STOP switch is turned on for selecting the corresponding mode, plunger solenoids 1, 2 and 3 are selectively energized as shown in the following table:

TABLE 1

| Mode | Plunger solenoid 1 | 2 | 3 |
| --- | --- | --- | --- |
| STOP | o | o | — |
| FWD | o | — | o |
| FF | — | o | o |
| REW | o | o | o |
| REC | ⊚ | — | o |

In the above table, the marks or symbols o and ⊚ indicate that the respective plunger solenoid is energized to pull or retract its rod or armature, and the mark — indicates that the respective plunger solenoid is deenergized. Further, the mark o indicates that the plunger solenoid is energized for a relatively short period, for example, for 0.3 to 0.7 seconds, whereas the mark ⊚ indicates that the plunger solenoid is energized for a relatively long period, for example, for longer than 0.8 seconds. The plunger solenoid 1 is shown to be energized for such longer time only in the change-over to the REC mode. The difference between the energizing times of solenoid 1 for the REC mode and FWD mode serves to distinguish those two modes. The plunger solenoid 3, when energized, serves to accomplish the direct mode change-over operation of the tape recorder from one of the FWD mode, REC mode, FF mode and REW mode into another of such modes without passing through the STOP mode. The change-over to any one of the five modes, namely the FWD mode, REC mode, FF mode, REW mode and STOP mode, is accomplished by predetermined combinations of the energization of the plunger solenoids 1 and 2, as indicated on Table 1.

FIGS. 1 and 2 show the STOP mode of the mode change-over mechanism of the tape recorder from which the tape recorder can be changed-over to the FWD mode, REC mode, FF mode or REW mode. In the STOP mode, toothless portion 11a of cam gear 8 and toothless portion 50 of the other cam gear 45 face toward drive gear 6. Accordingly, both cam gears 8 and 45 are disengaged from drive gear 6. The end portion 9a of rotary cam 9 on cam gear 8 is urged in the clockwise direction (FIG. 1) by the force of spring 15 through transmission lever 13. However, since pin 10a of cam gear 8 contacts with curved extension 18a of starting lever 16, rotation of cam gear 8 is prevented. The peripheral surface of eccentric radial cam 47 of cam gear 45 is pushed in the clockwise direction (FIG. 1) by drive lever 53 under the influence of spring 55. However, since stopper 49 of circular hub 48 on cam gear 45 contacts with pin 51 extending from the armature of plunger solenoid 3, cam gear 45 is restrained from rotating.

Change-over operation to FWD mode

The change-over operation to the reproducing or FWD mode will be particularly described with reference to FIGS. 5-7. When the FWD switch is turned on, electric power is supplied to the tape recorder and capstan shaft 5 is rotated in the counter-clockwise direction (FIG. 5) by the electric motor (not shown). The plunger solenoids 1 and 3 are energized substantially at the same time, but with the plunger solenoid 3 being actually energized slightly later than the plunger solenoid 1.

Upon such energization, rod 1a of plunger solenoid 1 is retracted or pulled in the upward direction as viewed on FIG. 5, and pin 28 of contact block 20 moves from the lower end of oblong opening 26 in selecting slide 22 to the upper end of such opening. Selecting slide 22 is not moved upward with rod 1a of plunger solenoid 1, and, accordingly, no load is imposed on plunger solenoid 1 by selecting slide 22.

The upward pull or retraction of rod 1a of plunger solenoid 1, causes the extending end portion 16b of starting lever 16 to be pushed upward by contact block 20 against the force of spring 19, so that starting lever 16 is turned in the clockwise direction to the position shown in FIG. 5. Accordingly, curved extension 18a of starting lever 16 is disengaged from pin 10a on cam gear 8, and at the same time, the other curved extension 18b of starting lever 16 is projected into the rotary path of pin 10a. Then, cam gear 8 is slightly turned to the position shown in FIG. 5 by transmission lever 13 under the influence of spring 15, so that cam gear 8 is engaged with drive gear 6. Accordingly, cam gear 8 is driven by drive gear 6 to rotate through substantially a half revolution in the clockwise direction (FIG. 5).

With the rotation of cam gear 8, end portion 13a of transmission lever 13 is pushed by end portion 9b of rotary cam 9, so that transmission lever 13 is turned against the force of spring 15 in the counter-clockwise direction, for example, to the position shown in dot-dash lines on FIG. 6. The pin 37 on transmission lever 13 comes into contact with end 35a of detecting slide 35, and then displaces the latter leftward, as viewed on FIG. 6, against the force of spring 36. In response to the turning of cam 9 through a half revolution, transmission lever 13 swings back and forth once. Accordingly, detecting slide 35 is made to slide forward and backward in the manner described above with reference to FIG. 4.

Since pin 28 on contact block 20 of plunger solenoid 1 is positioned at the upper end of oblong opening 26 of the selecting slide 22 in response to retraction of rod or armature 1a, selecting slide 22 is held thereby at the upper position shown on FIG. 6. Since plunger solenoid 2 is not energized, the other selecting slide 23 can be urged downward (FIG. 6) by the respective spring 25. When detecting slide 35 is displaced forwardly by stroke $S_2$ shown in FIG. 4, tab 31 of the selecting slide 23 comes to the right-hand end of projection 41, and selecting slide 23 can be moved downward (FIG. 6) by spring 25, so that tab 31 of selecting slide 23 moves into recess 43 of detecting slide 35. Thereafter, detecting slide 35 is further moved to the forward position $P_2$ on FIG. 4 which is shown by the dot-dash line on FIG. 6, and then it is displaced backward by spring 36. As a result, detecting slide 35 is stopped at the position $P_3$ on FIG. 4, and which is shown in full lines on FIG. 6, by tab 31 of selecting slide 23, accordingly, and pin 60 of mode change-over lever 58 is disposed at the FWD position A.

When cam gear 8 has turned through nearly a half revolution, toothless portion 11b of cam gear 8 faces drive gear 6 and, therefore, the drive of cam gear 8 stops. At that time, pin 10a of cam gear 8 is engaged by the hooked end of the curved extension 18b of starting lever 16 to stop cam gear 8.

The plunger solenoid 1 is deenergized after the rotation of cam gear 8 has been stopped, and rod or armature 1a of solenoid 1 is extended or moved back to its original position by spring 1b, as shown on FIG. 1. Contact block 20 of solenoid 1 moves away from end portion 16b of starting lever 16 so that the latter is free to be rocked back to its original position in the counter-clockwise direction by spring 19. As the result, the curved extension 18b of starting lever 16 is separated from pin 10a, and curved extension 18a is projected into the rotary path of pin 10b. In response to the foregoing, cam gear 8 is further slightly rotated in the clockwise direction by transmission lever 13, until pin 10b contacts extension 18a of starting lever 16. Thus, cam gear 8 is stopped in a position that is one-half revolution from the original position, and one forward and backward swing of transmission lever 13 has been completed.

Moreover, the rod or armature 3a of plunger solenoid 3 has been retracted or pulled leftward (FIG. 5) with the energization of the plunger solenoid 3, so that pin 51 is separated from stopper 49 on boss 48 of cam gear 45. At the same time, cam gear 45 is pushed by the action of drive lever 53 on radial cam 47, and it is slightly rotated in the clockwise direction to the position shown on FIG. 5. Thus, cam gear 45 is engaged with drive gear 6, and is rotated through approximately one revolution in the clockwise direction (FIG. 5) by drive gear 6.

As shown on FIG. 6, in the course of such rotation of cam gear 45, one end portion 53a of drive lever 53 is pushed by eccentric radial cam 47 rotating with cam gear 45 so that drive lever 53 is turned in the clockwise direction (FIG. 6) round its support pin 54 against the force of spring 55.

However, it is to be noted that, upon the start of the rotation of cam gear 45, drive lever 53 is not actually driven by eccentric radial cam 47 until the latter has attained the angular position shown by the two-dot dash lines on FIG. 5. Thus, a waiting or delay time is provided in a mechanical manner. During such waiting time, pin 60 of mode change-over lever 58 is substantially moved to the FWD position A in response to the selection of the stop position $P_3$ (FIG. 4) of detecting slide 35.

With the clockwise turning of drive lever 53 shown on FIG. 6, mode change-over lever 58 is moved by its support pin 59 fixed on drive lever 53 in the upward direction to the position shown on FIG. 1. The pin 60 of mode change-over lever 58 is engaged with the end 86a of FWD slide 86 to push the latter through a predetermined stroke in the upward direction, as viewed on FIG. 7. As a result of the foregoing displacement of slide 86, the tape recorder is suitably changed over to its FWD mode.

The energizing time of solenoid 3 is short, so that solenoid 3 is deenergized a short time after the start of the rotation of cam gear 45. As a result, rod 3a of solenoid 3 is restored to its original or extended position by spring 3b, as shown in FIG. 6, and pin 51 again contacts the peripheral surface of the circular boss 48 on cam gear 45.

Figure 7:
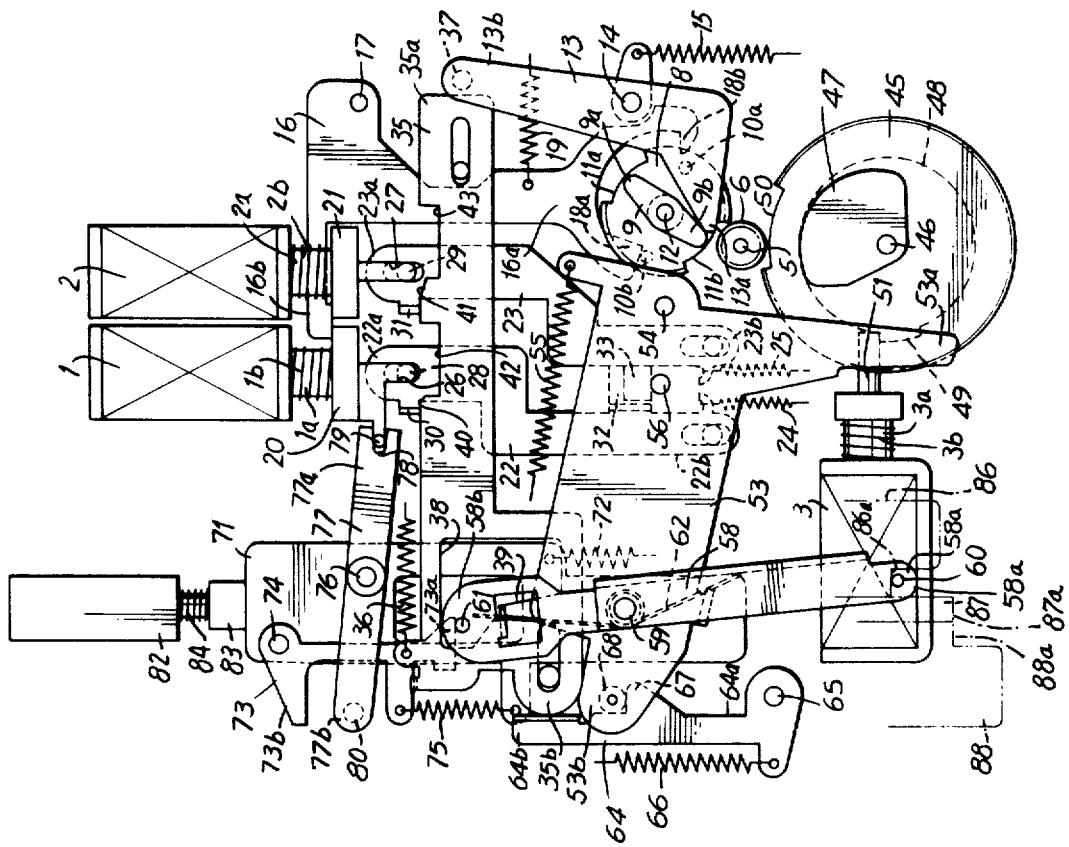

When drive lever 53 has been turned to the position shown on FIG. 7 to effect the predetermined stroke of mode change-over lever 58, pin 68 on drive lever 53 is locked by triangular projection 67 of lock lever 64. When detecting slide 35 is moved to its forward position $P_2$ shown by the dot-dash line on FIG. 6, end 64b of lock lever 64 is pushed by end 35b of detecting slide 35 and, therefore, lock lever 64 is turned in the counter-clockwise direction about pin 65 against the force of spring 66. Thus, lock lever 64 is temporarily moved to the lock-releasing position shown by the dot-dash lines on FIG. 6. However, detecting slide 35 is moved back toward its original position P₁ immediately after it reaches the forward position P₂ and, therefore, lock lever 64 is returned in the clockwise direction about pin 65 by spring 66 with the backward movement of detecting slide 35. Thus, pin 68 of drive lever 53 is locked by triangular projection 67 of lock lever 64.

On the other hand, as shown on FIG. 6, pin 56 on drive lever 53 comes into contact with tab 33 of the selecting slide 23, immediately after the commencement of the turning of drive lever 53 in the clockwise direction by eccentric radial cam 47. Thus, selecting slide 23 is pushed upward, as viewed on FIGS. 6 and 7, against the force of spring 25 in response to further clockwise turning of drive lever 53, so that tab 33 of selecting slide 23 is driven out of recess 43 of detecting slide 35. At that instant, detecting slide 35 is released from position P₃, and is free to be slidably displaced back to position P₁ shown in FIG. 7 by the action of spring 36. The tab 31 of selecting slide 23 then rides on projection 41 of slide 35 in response to the backward movement of the latter.

Further, in response to the movement of detecting slide 35, back to its position P₁, lock lever 64 is urged back to its original position, namely the locking position shown on FIG. 7. During such return of lock lever 64, pin 68 of drive lever 53 rides onto triangular projection 67 of lock lever 64, so that the drive lever 53 is locked by the lock lever 64, as previously mentioned and as shown on FIG. 7.

With drive lever 53 locked in the position shown on FIG. 7, FWD slide 86 is locked at the operative position thereof. After the locking of drive lever 53 in the position of FIG. 7, cam gear 45 continues to turn idly until it has completed one revolution, at which point toothless portion 50 of cam gear 45 reaches the original angular position and the drive of cam gear 45 by drive gear 6 ends. At the end of a complete revolution of cam gear 45, projection 49 thereon is again contacted by pin 51 associated with plunger solenoid 3 so as to stop cam gear 45 at the original angular position. In the above described manner, the taper recorder has been changed over into its FWD mode for playback or reproducing of recorded signals from a tape cassette in the usual manner.

Change-over operation to REC mode

Figure 8:
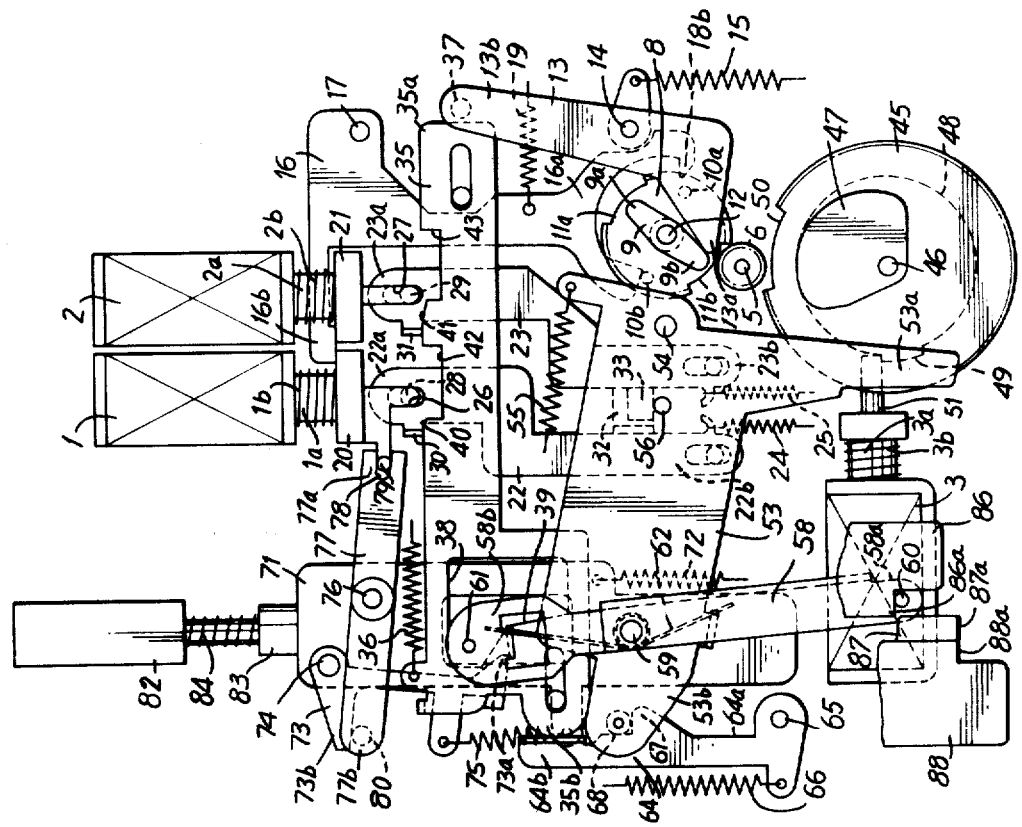
FIG. 8 is another view similar to FIG. 1, but illustrating the mode change-over operation to the REC mode.

The change-over operation to the REC or recording mode will be described with reference to FIGS. 2 and 8, and is nearly the same as the change-over operation to the FWD mode. However, the energizing time of plunger solenoid 1 for the change-over to the REC mode is longer than that for the change-over to the FWD mode. Thus, the selection of the FWD mode or the REC mode is determined by the time for which solenoid 1 is energized.

When the REC switch is turned on, electric power is again supplied to the tape recorder, capstan shaft 5 is driven by the electric motor, and plunger solenoids 1 and 3 are energized substantially at the same time. The rod 1a of solenoid 1 is pulled or retracted for a longer time than when the tape recorder is changed over to the FWD mode.

With the retraction of the rod 1a of plunger solenoid 1, transmission lever 77 is slightly turned, in the clockwise direction about pin 76, by the engagement of pin 79 on contact block 20 with recess 78, for example, as shown by the dot-dash lines on FIG. 2. As a result of the foregoing, recording/reproducing selecting lever 73 is free to be turned in the counter-clockwise direction about pin 74 by spring 75, as also shown by the dot-dash lines on FIG. 2. Thus, triangular end portion 73a of recording/reproducing selecting lever 73 is projected into the path of movement of pin 61 on mode change-over lever 58. The recording/reproducing selecting lever 73 is maintained in the foregoing position for a predetermined relatively longer time when the REC switch is actuated.

During that relatively longer time, operations similar to those described above for the change-over to the FWD mode are effected. In one of such operations, mode change-over lever 58 set at the FWD position A is moved in the upward direction as viewed on FIG. 8 in response to the clockwise turning of drive lever 53 about pin 54. In the course of such upward movement of mode change-over lever 58, pin 61 on the latter comes into contact with triangular end portion 73a of recording/reproducing selecting lever 73, and the latter is pushed upward by pin 61, as shown on FIG. 8. As a result, recording/reproducing change-over slide 71 is moved upward (FIG. 8) against the force of spring 72 to change over recording/reproducing change-over switch 82 to the recording condition. Thus, the tape recorder is changed over into its REC mode.

After the above-described operation for actuating switch 82, plunger solenoid 1 is deenergized, and rod 1a is moved back to its original position by spring 1b. Accordingly, recording/reproducing selecting lever 73 is turned back to the original position shown by the solid line on FIG. 2 and pin 80 acts against portion 73b of lever 73 to turn the latter against the force of spring 75 to the position shown in full lines. Thus, the triangular end portion 73a of recording/reproducing selecting lever 73 is disengaged from pin 61 of mode change-over lever 58.

Although recording/reproducing selecting lever 73 is also turned to the position shown by the dot-dash lines on FIG. 2 during the above described change-over operation to the FWD mode, the energizing time of plunger solenoid 1 is then relatively short, so that recording/reproducing selecting lever 73 is turned back to the position shown by full lines on FIG. 2 immediately after mode change-over lever 58 starts to move upward from the position shown on FIG. 6. Accordingly, in the change-over operation to the FWD mode, the recording/reproducing selecting lever 73 and the recording/reproducing change-over slide 71 are not pushed upward by pin 61 of mode change-over lever 58, and the recording/reproducing change-over switch 82 is not actuated so that it is maintained in the reproducing condition.

Change-over operation to FF mode

Figure 9:
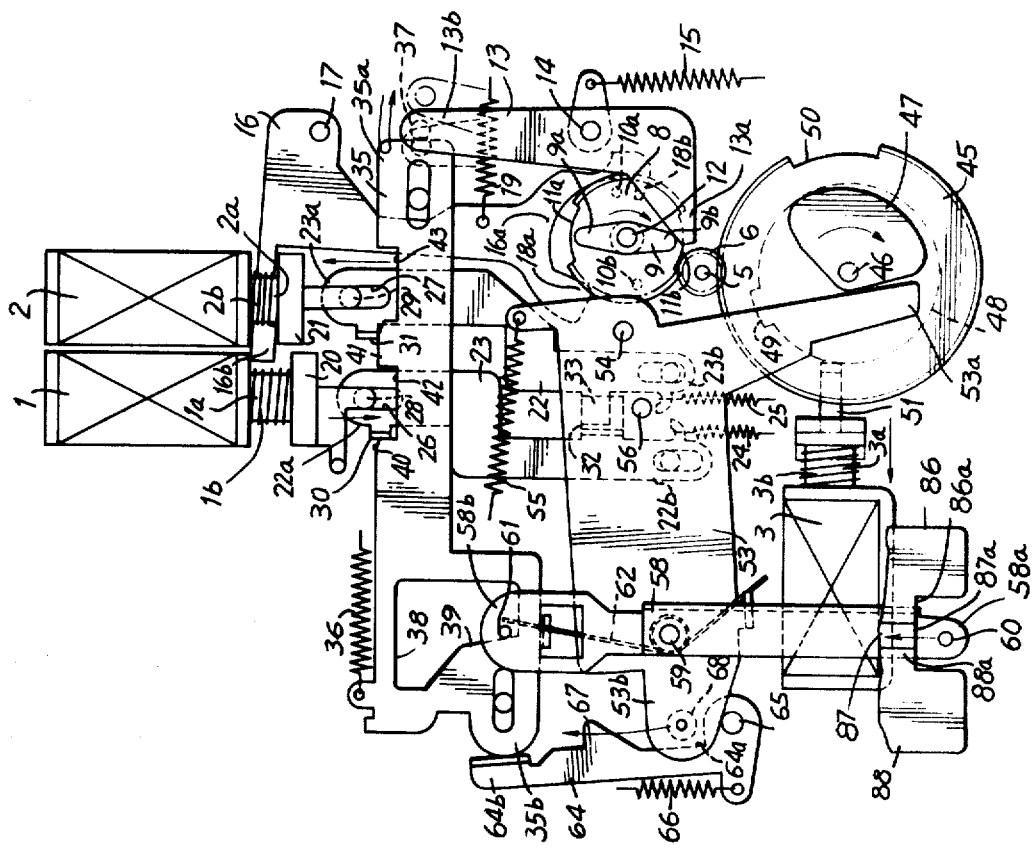
FIG. 9 is a view similar to a portion of FIG. 1, but illustrating the mode change-over operation to the FF mode of the tape recorder.

The change-over operation to the fast-forward or FF mode will be described with reference to FIG. 9. When the FF switch is turned on, electric power is supplied to the tape recorder, capstan shaft 5 is driven by the electric motor, and plunger solenoids 2 and 3 are energized substantially at the same time.

When rod 2a of energized plunger-solenoid 2 is retracted or pulled upward, starting lever 16 is rotated in the clockwise direction against the force of spring 19, since extending end portion 16b of starting lever 16 is pushed upward by contact block 21 on rod 2a. As a result of the foregoing, detecting slide 35 is moved forward and back or reciprocated once in the same manner as previously described for the change-over operation to the FWD mode.

In response to the retraction of rod 2a, pin 29 thereon is moved from the lower end to the upper end of oblong opening 27 in selecting slide 23 to hold the latter at its upper position. When plunger solenoid 2 is energized, selecting slide 23 is not moved upward but is merely retained in its upper position as pin 29 is moved in the oblong opening 27 of selecting slide 23. Accordingly, selecting slide 23 imposes no load on energized solenoid 2.

When detecting slide 35 is moved forward or in the direction of arrow a through the stroke $S_3$ on FIG. 4, tab 30 of selecting slide 22 rides off projection 40 of the detecting slide and is made to enter recess 42 thereof by the action of spring 24. As described with reference to FIG. 4, when the detecting slide 35 is moved backward thereafter in the direction of arrow b, it is stopped at position $P_4$ by tab 30 of selecting slide 22 to set pin 60 of the mode change-over lever 58 at the FF position B. Then, mode change-over lever 58 is moved upward by drive lever 53 in the same manner as in the change-over operation to the FWD mode. The mode change-over pin 60 is engaged with end 87a of FF slide 87 to move the latter upward through the predetermined stroke. In response to such movement of slide 87, the tape recorder is changed over to its FF mode, that is, its fast-forward drive system is activated.

With the clockwise rotation of drive lever 53, tab 32 of selecting slide 22 is moved upward by pin 56 on drive lever 53 against the force of spring 24. Accordingly, tab 30 of selecting slide 22 is withdrawn from recess 42 to release detecting slide 35 from position $P_4$ and permit its further backward movement to the original position $P_1$, whereupon tab 30 again rides on projection 40 of detecting slide 35.

Change-over operation to REW mode

Figure 10:
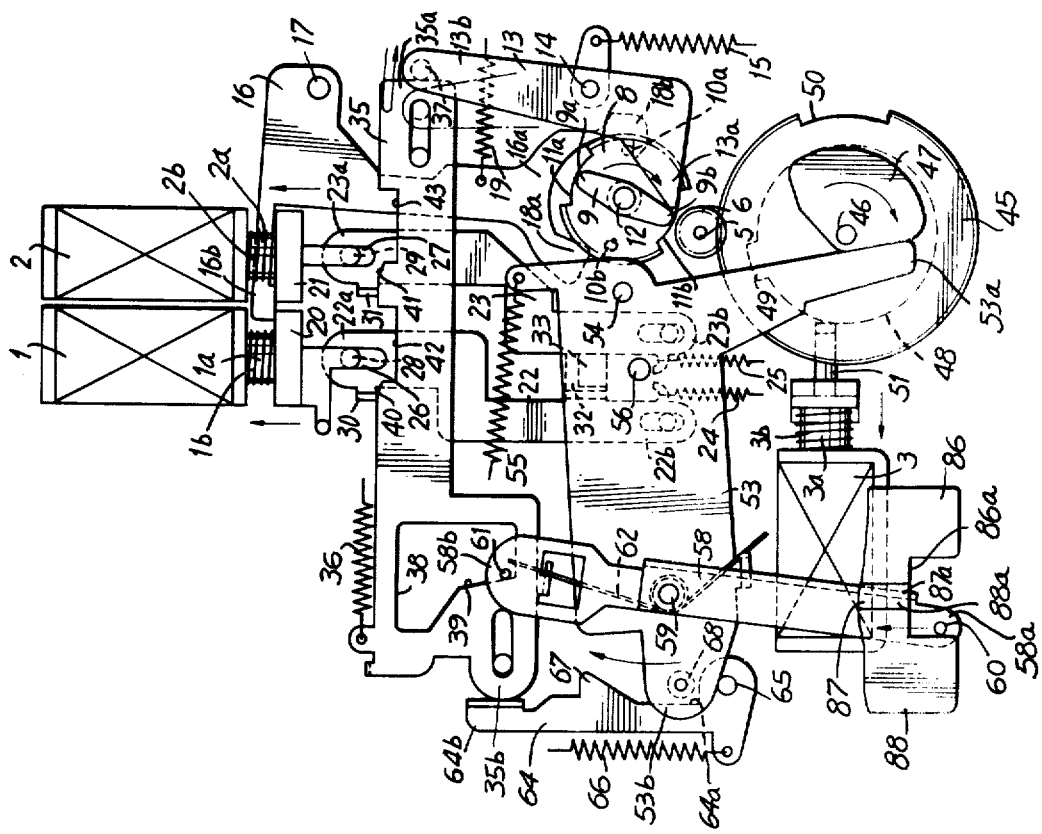
FIG. 10 is another view similar to FIG. 9, but illustrating the mode change-over operation to the REW mode of the tape recorder.

The change-over operation to the rewind or REW mode will be described with reference to FIG. 10. When the REW switch is turned on, electric power is supplied to the tape recorder, and capstan shaft 5 is driven by the electric motor. Further, plunger solenoids 1, 2 and 3 are energized substantially at the same time.

The rods 1a and 2a of plunger-solenoids 1 and 2 are retracted or pulled upward, and starting lever 16 is turned in the clockwise direction against the force of spring 19, since the extending end portion 16b of starting lever 16 is pushed upward by contact blocks 20 and 21 of plunger solenoids 1 and 2. As a result of the foregoing, detecting slide 35 is moved forward and backward once in the same manner as in the change-over operation to FWD mode.

With the retraction of rods 1a and 2a of plunger solenoids 1 and 2, pins 28 and 29 are moved from the lower ends to the upper ends of oblong openings 26 and 27 in selecting slides 22 and 23 so as to hold the latter at their upper positions. Since both slides 22 and 23 are held at their upper positions, detecting slide 35 is moved back to its original position $P_1$ and there stopped, as described with reference to FIG. 4. The pin 60 of mode change-over lever 58 is accordingly set at the REW position C.

In the same manner as in the changer-over operation to the FWD mode, mode change-over lever 58 is moved upward by drive lever 53, and pin 60 is engaged with end 88a of REW slide 88 to push the latter upward through the predetermined stroke. In response to such movement of slide 88, the tape recorder is conventionally changed over to its REW mode, that is, its rewind drive system is activated.

Change-over operation to STOP mode

Figure 11:
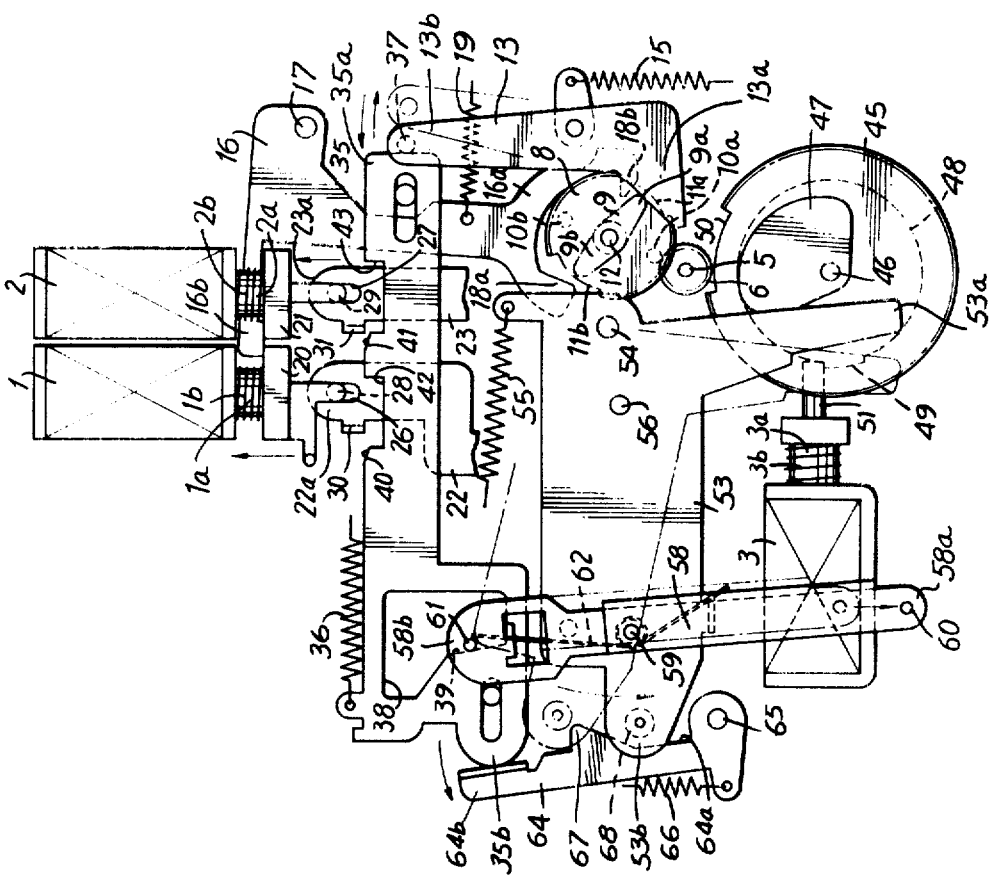
FIG. 11 is still another view similar to FIG. 9, but illustrating the mode change-over operation or return to the STOP mode of the tape recorder of FIG. 1.

The change-over operation to the STOP mode is illustrated on FIG. 11, and it may be effected with the tape recorder in its FWD mode, REC mode, FF mode or REW mode. In any one of these modes, detecting slide 35 is stopped at the original position $P_1$, and drive lever 53 is locked by lock lever 64 at its operative position shown by the dot-dash line.

When the STOP switch is turned on with the tape recorder in its FWD mode, REC mode, FF mode or REW mode, plunger solenoids 1 and 2 are energized substantially at the same time, and rods 1a and 2a of the plunger solenoids 1 and 2 are retracted. Accordingly, as in the change-over operation to the REW mode, selecting slides 22 and 23 are both maintained at their upper positions so that detecting slide 35 is moved forward and backward once without interruption, that is, without being arrested in its return to original position $P_1$.

When detecting slide 35 is moved forward to forward position $P_2$, as described with reference to FIG. 4, the top end portion 64b of lock lever 64 is pushed by end 35b of the detecting slide, so that lock lever 64 is turned in the counter-clockwise direction and its triangular projection 67 is separated from pin 68 of the drive lever 53 to prevent locking of the latter. Thus, drive lever 53 is angularly returned to its original position shown by the solid line on FIG. 11 by the action of spring 55. With the backward movement of drive lever 53 and detecting slide 35, mode change-over lever 58 is moved back to its original position, and, therefore, the previously actuated FWD slide 86, FF slide 87 or REW slide 88 is moved back to its original position. Thus, the tape recorder is changed over to its STOP mode, and then electric power is suitably cut off to stop the electric motor.

In the above described mode change-over mechanism according to an embodiment of this invention, the mode change-over lever 58, and therefore, the mode change-over pin 60, is set at either the FWD (REC) position A, the FF position B, or the REW position C by selection of the stop position of detecting slide 35 in correspondence to the desired change-over operation to the FWD (REC) mode, the FF mode or the REW mode, and then selecting slides 22 and 23 are moved upward against forces of springs 24 and 25 by pin 56 on drive lever 53 to release the detecting slide 35 from such stop position. Thus, detecting slide 35 is always moved back to original position $P_1$ after change-over to the desired mode. On the other hand, when the tape recorder is again changed over to the next desired mode, detecting slide 35 is moved forward to temporarily release drive lever 53 from being locked by lever 64 at its operative position, and then drive lever 53 is again angularly displaced or turned to its operative position. Accordingly, the tape recorder can be directly changed over to any one of the FWD mode, REC mode, FF mode and REW mode from any other of such modes without passing through the STOP mode. Thus, the "mutual change-over operation" can be effected in the mode change-over mechanism according to the above described embodiment of this invention.

Figure 12:
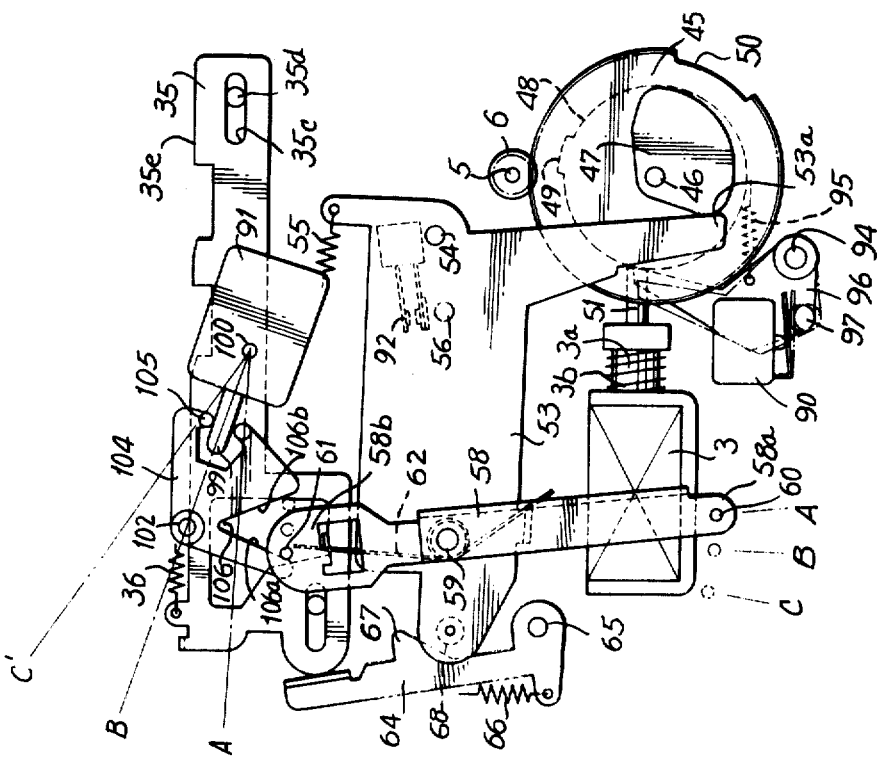
FIG. 12 is a plan view for illustrating a switch arrangement in the tape recorder of FIG. 1.

Referring now to FIG. 12, it will be seen that, in a switch arrangement for preventing misoperation of the above described mode change-over mechanism, a position-detecting switch 90 for cam gear 45 is arranged near the latter, and may be, for example, a micro switch. A mode switch 91 for detecting the FWD mode, FF mode and REW mode is arranged near detecting slide 35, and may be, for example, a leaf-type inversion switch. A mode set detecting switch 92 is arranged near drive lever 53, and may be, for example, a leaf switch actuable by pin 56.

The position detecting switch 90 is actuable by a projection 97 on a switch operating lever 96 which is rotatably supported by a pin 94 and urged by a spring 95 in the clockwise direction, as viewed on FIG. 12. An end of switching operating lever 96 is pressed against the circumferential surface of the circular boss 48 of cam gear 45. The mode switch 91 may be in the form of a three-contact change-over switch in which an inversion lever 99 is pivoted on a support pin 100. A neutral or antral position of inversion lever 99 corresponds to a FF mode position B', and inversion lever 99 can be turned in the counter-clockwise direction from FF mode position B' to a FWD mode position A', or in the clockwise direction from the FF mode position B' to a REW mode position C'. The inversion lever 99 is designed to return automatically to the FF mode position B' from either the FWD mode position A' or the REW mode position C'. The lever 99 of mode switch 91 is shown to be actuated by a bifurcation 105 of a switch operating lever 104 which is pivotally supported by a pivot pin 102. A V-shaped recess 106 is formed in switch operating lever 104, and pin 61 of mode change-over lever 58 is received in V-shaped recess 106.

In the STOP mode, the end of switch operating lever 96 rides on stopper 49 of cam gear 45 to dispose position detecting switch 90 in its OFF state. Upon commencement of a change-over operation to the FWD mode, FF mode or REW mode and as cam gear 45 starts to rotate in the clockwise direction, stopper 49 moves out from under switch operating lever 96 and the latter is angularly displaced in the clockwise direction by the action of spring 95. Accordingly, position detecting switch 90 is actuated by projection 97 of switch operating lever 96 so as to be changed-over to its ON state.

When mode change-over lever 58, after having been set at the FWD position A, FF position B or REW position C, is moved upward by drive lever 53, pin 61 on mode change-over lever 58 is moved toward the inside of U-shaped recess 106 in switch operating lever 104. In the change-over operation to the FW mode, pin 61 pushes one edge 106a of the V-shaped recess 106 to turn switch operating lever 104 in the clockwise direction as shown on FIG. 12, so that lever 99 of switch 91 is changed over to its FWD position A' by the bifurcation 105 of switch operating lever 104. In the change-over operation to the REW mode, pin 61 pushes another edge 106b of V-shaped recess 106 to turn switch operating lever 104 in the counter-clockwise direction, so that lever 99 of switch 91 is changed over to the REW position C'. In the change-over operation to the FF mode, pin 61 is substantially centered in recess 106 so that switch operating lever 104 is turned neither in the clockwise direction nor in the counter-clockwise direction by pin 61 on mode change-over lever 58. Accordingly, the inversion lever 99 of mode switch 91 is maintained at its neutral position (FF mode position B').

As above described, in any one of the mode change-over operations, drive lever 53 is turned to the operative position shown in FIG. 7 and is there locked by lock lever 64 so as to complete the mode change over operation. Immediately before such completion of the mode change-over operation, mode set detecting switch 92 is actuated into its ON state by pin 56 on drive lever 53.

Immediately before the completion of a full revolution by cam gear 45, the end of switch operating lever 96 rides onto stopper 49 and is angularly displaced thereby against the force of spring 95, and position detecting switch 90 is thereby changed over into its OFF state.

An example of electrical circuits that may be used for the above-described tape recorder will now be described with reference to FIG. 13, in which switches $S_1$ to $S_5$ represent the previously referred to REW switch, STOP switch, FWD switch, FF switch and REC switch, respectively, and are each shown to have stationary contacts a and b. When any one of the switches $S_1$ to $S_5$ is depressed, its movable contact engages the respective stationary contact a. Conversely, when any one of switches $S_1$ to $S_5$ is released from depression, its movable contact again engages the other respective stationary contact b.

Figure 13:
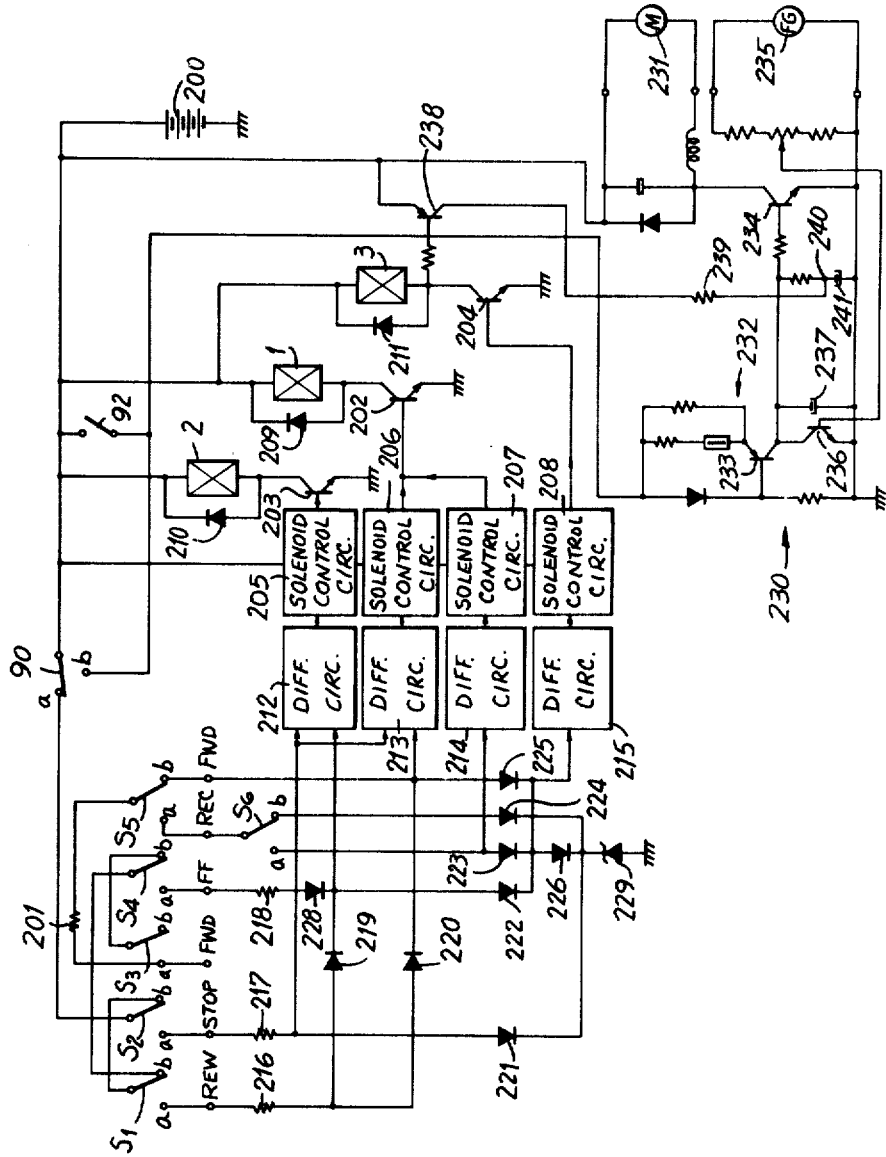
FIGS. 13 to 17 are circuit diagrams of respective electrical circuits usable for the tape recorder of FIG. 1.

The movable contacts and stationary contacts a and b of switches $S_1$ to $S_5$ are connected in the manner shown in FIG. 13. More particularly, voltage from a DC power source 200 is applied through switch 90 to the movable contact of switch $S_2$. When any one of the switches $S_1$ to $S_5$ is selectively depressed or changed over to engage its respective stationary contact a, the voltage of DC power source 200 is applied to such selected stationary contact a. When switch $S_3$ is depressed or changed over to engage its stationary contact a for selecting the FWD mode, the voltage of DC power source 200 is applied to the stationary contact a of switch $S_3$ and further through a resistor 201 to stationary contact b of switch $S_5$. The tape recorder hue being described is designed to be changed over to the REC mode by simultaneous depressing of the switches $S_3$ and $S_5$. Further, when any other two or more of the switches $S_1$ to $S_5$ are depressed at the same time, the switch connection is so designed that the tape recorder is changed over to a particular mode in accordance with the preferential order of STOP, REW, FF and FWD modes.

The plunger solenoids 1, 2 and 3 are shown on FIG. 13 to be connected between collectors of transistors 202, 203 and 204, respectively, and the DC power source 200. For the various modes, the plunger solenoids 1, 2 and 3 are selectively energized in the manner shown in Table 1. First and second plunger-solenoid control circuits 206 and 207 are connected to the base of transistor 202 to control the energization of plunger solenoid 1. A third plunger-solenoid control circuit 205 is connected to the base of transistor 203 to control the energization of the plunger solenoid 2, and a fourth plunger-solenoid control circuit 208 is connected to the base of transistor 204 to control the energization of plunger solenoid 3. In the change-over operation of the REC mode, plunger solenoid 1 is energized with the output voltage of second plunger-solenoid control circuit 207 which has a relatively larger time constant than control circuit 206 so that plunger solenoid 1 is energized for a longer time than in the change-over operation to the FWD mode. Diodes 209, 210 and 211 are connected in parallel with plunger solenoids 1, 2 and 3, respectively, to absorb the counter electromotive forces of the latter.

The control circuits 205, 206, 207 and 208 are driven with trigger pulses from differentiating circuits 212, 213, 214 and 215, respectively, to generate voltages of respective predetermined levels for respective predetermined times.

The switches $S_1$ to $S_5$ are connected through a diode matrix constituted by resistors 216, 217 and 218 and diodes 219 to 228 to the differentiating circuits 212 and 215 in the manner shown on FIG. 13. A zener diode 229 for providing a constant voltage is connected between the diode matrix and the ground. A switch $S_6$ is provided to detect the usual tab which is provided in a tape cassette for preventing erroneous erasing of recorded material that is to be retained. When such tab is broken off or removed, switch $S_6$ engages its stationary contact b to prevent erroneous inadvertent erasing. When the tab is present, switch $S_6$ engages its other stationary contact a for permitting the REC mode.

The position detecting switch 90 of FIG. 12 is shown on FIG. 13 to have a movable contact connected to souce 200, a stationary contact a connected to the movable contact of switch $S_2$, and a stationary contact b connected to a motor drive circuit 230. In the change-over operation to any one of the operating modes except the STOP mode, switch 90 is changed over to its stationary contact b from stationary contact a substantially at the same time that cam gear 45 starts to rotate in response to retraction of the rod 3b of plunger solenoid 3. The voltage of DC power source 200 is supplied through stationary contact b of switch 90 to motor drive circuit 230 during the change-over operation. When the cam gear 45 has completed one revolution, switch 90 is returned to its stationary contact a. After completion of a change-over operation, the voltage of DC power source 200 is applied through detecting switch 92 to motor drive circuit 230. As described above with reference to FIG. 12, detecting switch 92 is actuated to its closed state by pin 56 on drive lever 53 immediately before the end of a change-over operation. Thereafter, and for so long as the tape recorder remains in the selected operating mode, detecting switch 92 remains closed to supply the voltage of DC power source 200 to motor drive circuit 230 for driving a motor 531 which rotates the capstan shaft 5.

The motor drive circuit 230 is shown to include a constant current circuit 232 having a transistor 233, a drive transistor 234 an FG (Frequency generator) 235 for detecting rotational speed of the motor 231, a control transistor 236 and a smoothing capacitor 237. The voltage of DC power source 200 is applied to circuit 230 as drive voltage for the motor 231 and as a source voltage for the constant current circuit 232.

A transistor 238 is connected to drive transistor 204 for plunger solenoid 3. The collector current of transistor 238 is supplied through a resistor 239 to a junction point 240 in a base bias circuit for drive transistor 234. A capacitor 241 having small capacitance is connected between point 240 and ground and works to correct phase and eliminate noise.

The above described circuit of FIG. 13 operates as follows:

In the STOP mode, switches $S_1$ and $S_5$, 90 and 92 are in the positions shown on FIG. 13.

If it is desired to change-over the tape recorder from its STOP mode to its rewind or REW mode, switch $S_1$ is changed over to engage its stationary contact a, and the voltage of DC power source 200 is then applied to the stationary contact a of switch $S_1$. The voltage is set to a predetermined voltage depending on the Zener voltage of Zener diode 229 through one route constituted by resistor 216, diodes 219, 222 and 226, and Zener diode 529, and another route constituted by resistor 216, diodes 220, 225 and 226, and Zener diode 229. Such predetermined voltage is applied to differentiating circuits 212, 213 and 215 from diodes 219, 220 and 225, respectively.

Teigger pulses are produced by the differentiating cirsuits 212, 213 and 215 with the application of the mentioned predetermined voltage thereto, and control voltages are generated by control circuits 205, 206 and 208 in response to such trigger pulses. The transistors 202, 203 and 204 are changed-over to their conductive state for a predetermined time in response to the control voltages, and thereby energize solenoids 1, 2 and 3. The change-over operation to the REW mode as described above with reference to FIG. 10 starts with the energization of solenoids 1, 2 and 3. As cam gear 45 starts to rotate, switch 90 is changed over to engage its stationary contact b and, as a result thereof, voltage is supplied to constant current circuit 232 of motor drive circuit 230. Since transistor 204 is put into its conductive state, transistor 238 is also made conductive. The collector current of transistor 238 flows through point 241 to the base of transistor 234 to make the latter conductive. As a result, motor 231 starts to rotate. The change-over operation to the rewind or REW mode is then sequentially effected by means of the torque of motor 231. The transistor 238 is returned to the non-conductive state upon cessation of the energization of solenoid 3, at which time the current to point 241 is cut off. However, since capacitor 237 is charged to a sufficiently high voltage, the transistor 234 is maintained thereby in the conductive state to continue the driving of motor 231. Switch 92 is closed immediately before completion of the change-over operation to the REW mode and finally switch 90 is changed over or returned to engagement with its stationary contact a at the end of the change-over operation to the REW mode. Thereafter, the voltage from source 200 is applied through switch 92 to the motor drive circuit 230 continue operation of the tape recorder in its rewind or REW mode.

When switch $S_2$ is changed over to engage its stationary contact a, the voltage of power source 200 is applied therethrough to the circuit consisting of resistor 217, diode 221 and Zener diode 229, for obtaining a predetermined voltage which is applied to differentiating cirxuits 212 and 213. The resulting control voltages from the control circuits 505 and 506 change over transistors 202 and 203 to the conductive state and thereby causes energizing of solenoids 1 and 2. The change-over operation to the STIO mode starts with such energization of solenoids 1 and 2, and then proceeds as described above with reference to FIG. 11. When drive lever 53 is returned to its original position, switch 92 is opened to stop motor 231.

When switch $S_3$ is changed over to engage its stationary contact a for initiating change-over to the reproducing or FWD mode, the voltage of power source 200 is applied through the stationary contacts b of the switches $S_2$, $S_1$ and $S_4$ to the stationary contact a of switch $S_3$, and the voltage is further applied through resistor 201 to the stationary contact b of switch $S_5$. The voltage at the stationary contact a of the switch $S_3$ is applied to a conventional playback or reproducing circuit (not shown).

The voltage at the stationary contact b of switch $S_5$ is set to a predetermined voltage by way of diodes 225 and 226, and Zener diode 229. Such predetermined voltage is applied to differentiating circuits 213 and 215 and, as a result, solenoids 1 and 3 are energized for a predetermined time. The mode change-over operation to the FWD mode starts with the energization of solenoids 1 and 3 and continues as described above with reference to FIGS. 5-7. Immediately after the start of the mode change-over, switch 90 is changed over to engage its stationary contact b and thereby apply voltage from source 200 to motor driven circuit 230. In the same manner as in the change-over operation to the REW mode, transistor 238 becomes conductive and the collector current thereof flows through the point 240 to the base of transistor 234 to make the latter conductive, and thereby to drive motor 231. The change-over operation to the FWD mode is then effected with the torque of motor 231. After transistor 238 is returned to its non-conductive state, the transistor 234 is maintained in the conductive state with the charging voltage of capacitor 237 of the constant current circuit 232 to which the voltage of the power source 200 has been applied through switch 90. Thus, motor 231 continues to rotate, and switch 92 is closed immediately before the change-over operation to the FWD mode is finished, at which time switch 90 is again changed over to engage its stationary contact a.

When switch S$_4$ is changed over to engage its stationary contact a for effecting change over to the fast-forward or FF mode, the voltage of power source 200 is applied through the stationary contacts b of switches S$_2$ and S$_1$ to the stationary contact a of switch S$_4$, and it is set to a predetermined voltage by way of resistor 218, diodes 228, 222 and 226 and Zener diode 229. Such predetermined voltage is applied to differentiating circuits 212 and 215 and, as a result, solenoids 2 and 3 are energized for a predetermined time. In the same manner as in the change-over operation to the REW mode, motor 231 is driven to effect the change-over operation to the FF mode and then to maintain such FF mode.

When the switches S$_3$ and S$_5$ are simultaneously changed over to engage their stationary contacts a for initiating change over to the recording or REC mode, the voltage of power source 200 is applied through the stationary contacts b of switches S$_2$, S$_1$ and S$_4$, the stationary contact a of switch S$_3$ and resistor 201 to the stationary contact a of switch S$_5$. When the frangible tab for preventing erroneous erasing is broken or removed from the tape cassette, switch S$_6$ is engaged with its stationary contact b and, therefore, the voltage is merely applied through diode 224 to Zener diode 229, that is, no voltage is applied to any of the differentiating circuits 205 to 208. Accordingly, none of the solenoids 1, 2 and 3 are energized. When the frangible tab is present in the tape cassette, for indicating that a recording operation may be performed, switch S$_6$ is engaged with its other stationary contact a and a predetermined voltage set by means of diodes 223 and 226, and Zener diode 229 is applied to differentiating circuits 214 and 215. As a result, solenoids 1 and 3 are energized with control voltages from control circuits 207 and 208. However, in this change-over operation to the REC mode, solenoid 1 is energized for a longer time with the control voltage from control circuit 207 than the solenoid 3 is energized with the control voltage from control circuit 208. Thus, in the manner described above with reference to FIG. 8, the tape recorder is changed over to the REC mode with the required forces for such change-over being mainly derived from operation of motor 231.

The tape recorder can be changed over from one of the REW mode, FF mode, FWD mode and REC mode to any other one of such modes without going through the STOP mode.

In the circuit of FIG. 13, as soon as the mode selecting switches S$_1$, S$_3$, S$_4$ and S$_5$ are selectively activated or depressed, for initiating the REW mode, FF mode, FWD mode or REC mode, transistor 238 and, therefore, transistor 234 of motor drive circuit 230 are turned on to drive motor 231 so that the desired or selected mode change-over operation can be effected with the torque of motor 231. Substantially at the same time as one or more of the mode selecting switches is activated or depressed, the voltage of power source 200 is applied through switch 90 to capacitor 237 of the constant current circuit 232 to charge capacitor 237. After solenoid 3 is deenergized, the charging voltage of capacitor 237 continues to turn ON transistor 234 so that motor 231 continues to operate. During the mode change operating, the voltage is applied through switch 90 to motor drive circuit 230. After the mode change operation has been effected, the voltage is applied through switch 92 to motor drive circuit 230. Thus, misoperation is prevented, and the mode change-over operation is suirely effected so as to reliably obtain the desired mode.

When the voltage of power source 200 becomes lower than a minimum value for which operation is guaranteed, there is the possibility that the desired mode change-over operation will not be effected in response to actuation of the corresponding mode selecting switch or that some troubles may occur in the operation of the tape recorder. Such difficulty is overcome by the electrical circuit of FIG. 14 in which elements or circuits corresponding to the switches 90 and 02, and the motor drive circuit 230 of FIG. 13 are omitted for simplification of the drawing, and further in which elements corresponding to those described above with reference to FIG. 13 are identified by the same reference numerals.

When the switch S$_1$, S$_3$ or S$_4$ is changed over to engage its stationary contact a, the voltage of DC power source 200 is applied to a corresponding input terminal 242, 243 or 244 of a detecting circuit 245 which includes diodes 246, 247 and 248, resistors 249, 250 and 251 and transistors 252 and 253. If the voltage of battery 200 is lower than a minimum operation-guarantee voltage, transistor 252 cannot be made conductive. When transistor 252 is non-conductive, the collector voltage of transistor 252 is raised so as to make transistor 253 conductive. As a result, the anode potential of diode 226 becomes neanly the ground potential, and, therefore, the voltage is not applied to any of differentiating circuit 212 to 215 and none of solenoids 1, 2 and 3 are energized. Thus, when the power source of battery 200 is lower than the minimum operation-guaranteed voltage, the tape recorder cannot be changed over to any of the REW mode, FWD mode, FF mode and REC mode even though the respective mode selecting switch is depressed.

When the voltage of souce or battery 200 is higher than the minimum operation-guaranteed voltage, transistor 252 becomes conductive with the actuation of any one of the mode selecting switches S$_1$, S$_3$ and S$_4$, and, therefore, transistor 253 is not turned ON. Thus, voltage can be applied to differentiating circuits 212 to 215, as described with reference to FIG. 13.

Figure 14:
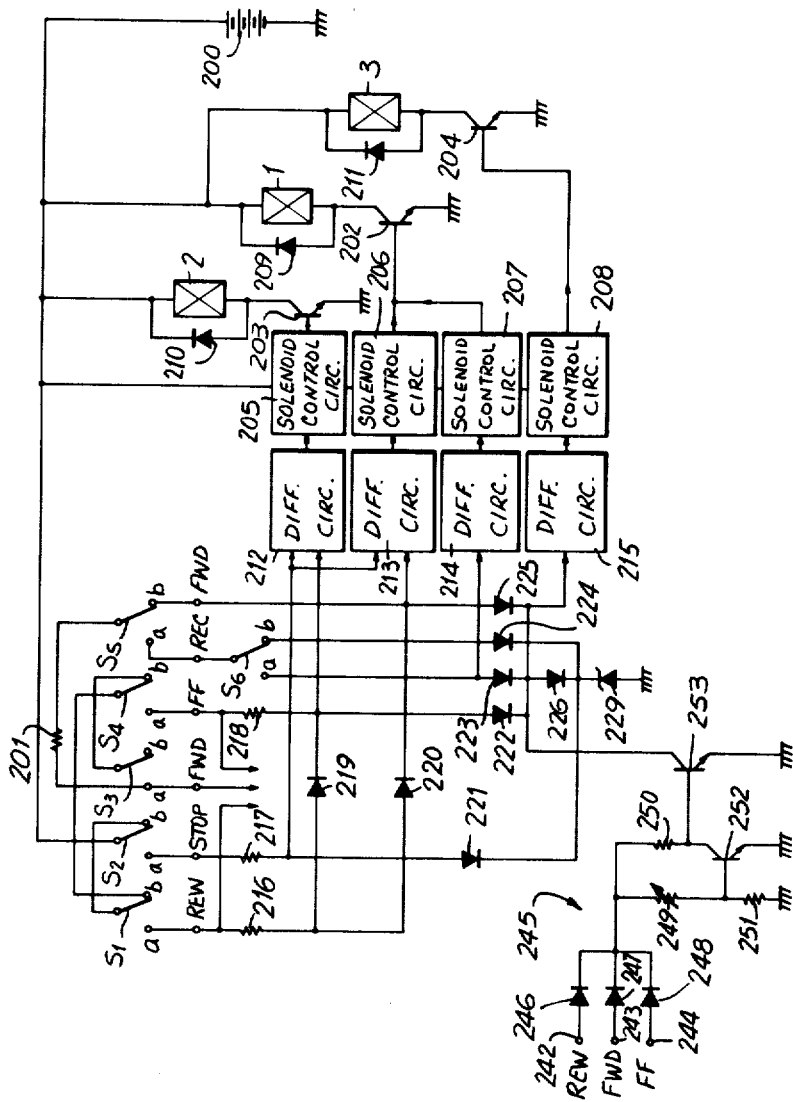

Since the electrical circuit of FIG. 14 detects a certain reduction of the voltage of battery 200 to forbid or prevent a mode change-over operation, misoperation can be prevented when the voltage of the battery 200 is lower than the minimum operation-guaranteed voltage. Further, it is only when a mode selecting switch $S_1$, $S_3$ or $S_4$ is actuated to engage its respective stationary contact a that some current flows through the transistor 252 or 253 so that electric power is not idly consumed.

In the above described tape recording according to this invention, solenoids 1, 2 and 3 are used as triggers for the mode change-over mechanism. If a mode selecting switch corresponding to a particular operating mode is again actuated after the change-over to that mode has been completed, two or three of the solenoids 1, 2 and 3 are again energized, and electric power is idly consumed. Further, when the rod or armature of a plunger solenoid is retracted in response to the energization of the latter, an undersirable sound is made.

Figure 15:
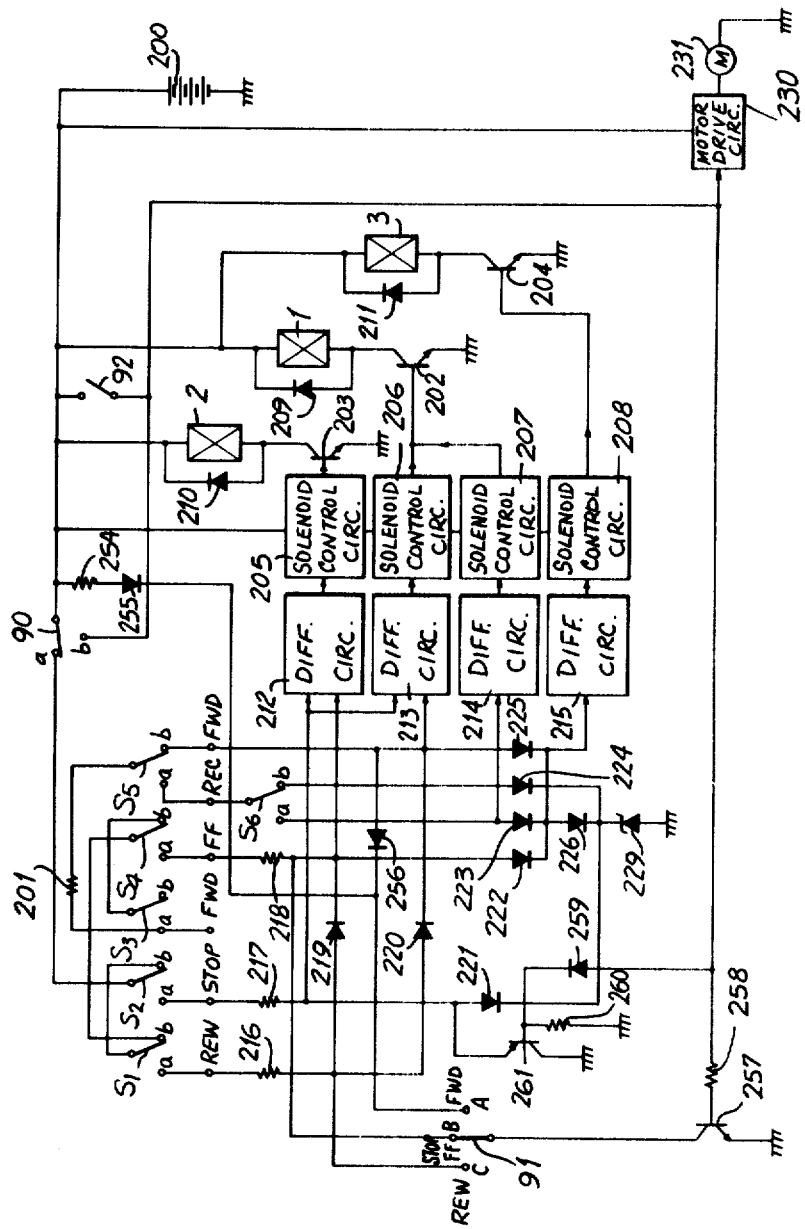

FIG. 15 shows another example of electric circuits adapted to solve the above described problem in tape recorders according to this invention, and in which parts corresponding to those described with reference to FIGS. 13 and 14 are identified by the same reference numerals.

In FIG. 15, the motor drive circuit 230 is simply represented as a block connected with motor 231. A voltage of a battery as a DC power source 200 is applied through a resistor 254 and a light emission diode 255 to a contact A of mode switch 91 which has been described with reference to FIG. 12. The mode switch 91 has contacts B and C in addition to the contact A, and such contacts A, B and C correspond to the FWD (REC) position A, FF (STOP) position B and REW position C, respectively. The contact C of mode switch 91 is connected through a resistor 216 to the stationary contact a of switch $S_1$. The contact B of mode switch 91 is connected through a resistor 218 to the stationary contact a of switch $S_4$. The contact A of mode switch 91 is connected through a diode 256, the stationary contact b of switch $S_5$ and resistor 201 to the stationary contact a of switch $S_3$. The movable contact of mode switch 91 is connected to a collector of an NPN transistor 257. The voltage of battery 200 is applied to motor drive circuit 230 and also through a resistor 258 to the base of transistor 257. The voltage from battery 200 is further applied through a diode 259 and divided by a resistor 260 before being applied to the base of a PNP transistor 261. The emitter of transistor 261 is connected through resistor 217 to the stationary contact of a switch $S_2$.

The electrical circuit of FIG. 15 operates as follows:

In the STOP mode, the switches $S_1$ to $S_5$ and 90 to 92 are all disposed as shown on FIG. 15. When switch $S_1$ is changed over to engage its stationary contact a, solenoids 1, 2 and 3 are energized to start the change-over operation to the REW mode. The switch 92 is closed just before the change-over operation to the REW mode is completed, and upon such completion, switch 90 is again changed over to engage its contact a at the end of the change-over operation. The mode switch 91 is changed over to engage its contact C as described above with reference to FIG. 12.

With the tape recorder in the REW mode, voltage is applied through switch 92 to motor drive circuit 230 and to transistors 257 and 261. If switch $S_1$ is depressed or changed over to engage its stationary contact a at a time when the tape recorder is already in the REW mode, the voltage at stationary contact a of switch $S_1$ is applied through resistor 216 and the contact C of mode switch 91 to the collector of transistor 257 to make the latter conductive and, therefore, the voltage is muted. Accordingly, no voltage is applied to differentiating circuits 212, 213 and 215, and solenoids 1, 2 and 3 are not energized.

When switch $S_2$ is actuated, solenoids 1 and 2 are energized to effect the change-over operation to the STOP mode, during which drive lever 53 is turned back to its original position, and the switch 92 is opened to stop the motor 231. Finally, the movable contact of mode switch 91 is changed over to engage its contact B.

If switch $S_2$ is actuated to engage its stationary contact a at a time when the tape recorder is already in the STOP mode, the voltage at such stationary contact a is applied to the emitter of transistor 261 to make the latter conductive. Accordingly, no voltage is applied to differentiating circuits 212, 312, and solenoids 1 and 2 are not energized.

When switch $S_3$ is changed over to engage its stationary contact a, solenoids 1 and 3 are energized to start the change-over operation to the FWD mode. At the end of the change-over operation to the FWD mode, switch 92 is closed, and switch 90 is changed over to engage its stationary contact a. Further, mode switch 91 is changed over to engage its contact A. Accordingly, light emission diode 255 emits light.

If switch $S_3$ is again actuated to engage its stationary contact a at a time when the tape recorder is already in the FWD mode, transistor 257 is made conductive, and so no voltage is applied to differentiating circuits 213 and 215, with the result that solenoids 1 and 3 are not energized.

When switch $S_4$ is actuated to engage its stationary contact a, solenoids 2 and 3 are energized for initiating the change-over operation of the FF mode. When such change-over to the FF mode is completed, mode switch 91 is changed over to engage its contact B. Thereafter, if switch $S_4$ is again actuated to engage its stationary contact a, transistor 257 is made conductive and solenoids 2 and 3 are not energized.

When switches $S_3$ and $S_5$ are simultaneously depressed to engage their respective stationary contacts a, for initiating change-over to the REC mode, solenoids 1 and 3 are energized. The solenoid 1 is energized with the output of control circuit 207 for a longer time than the solenoid 3 is energized with the output of control circuit 208, so that, as previously described, the tape recorder is changed over to the REC mode.

In the REC mode, mode switch 91 is engaged with its contact A. Accordingly, if the switches $S_3$ and $S_5$ are again changed over to engage their respective stationary contacts a with the tape recorder already in the REC mode, transistor 257 is made conductive, and therefore no voltage is supplied to differentiating circuits 213 and 215. Thus, the solenoids 1 and 3 are not again energized.

Accordingly, with the electrical circuits of FIG. 15, when one or more of the switches $S_1$ to $S_5$ is or are again actuated for initiating change-over of the tape recorder to a particular mode in which the tape recorder is already disposed, none of the solenoids 1, 2 and 3 is energized. Further, if light emitting diodes are connected to the contacts C and B of mode switch 91 and to the transistor 261, the REW mode, FF mode and STOP mode can be respectively displayed thereby.

In the above described tape recorder, if a mode selecting switch other than the STOP switch $S_2$, for example, the fast forward switch $S_4$ is actuated immediately after the actuation of the STOP switch, there is the possibility that, while solenoids 1 and 2 are energized in response to actuation of switch $S_2$, the solenoids corresponding to the later actuated mode selecting switch $S_4$ will be energized to change over the tape recorder to an operating mode other than the operation mode corresponding to the subsequently actuated mode selecting switch $S_4$.

Figure 16:
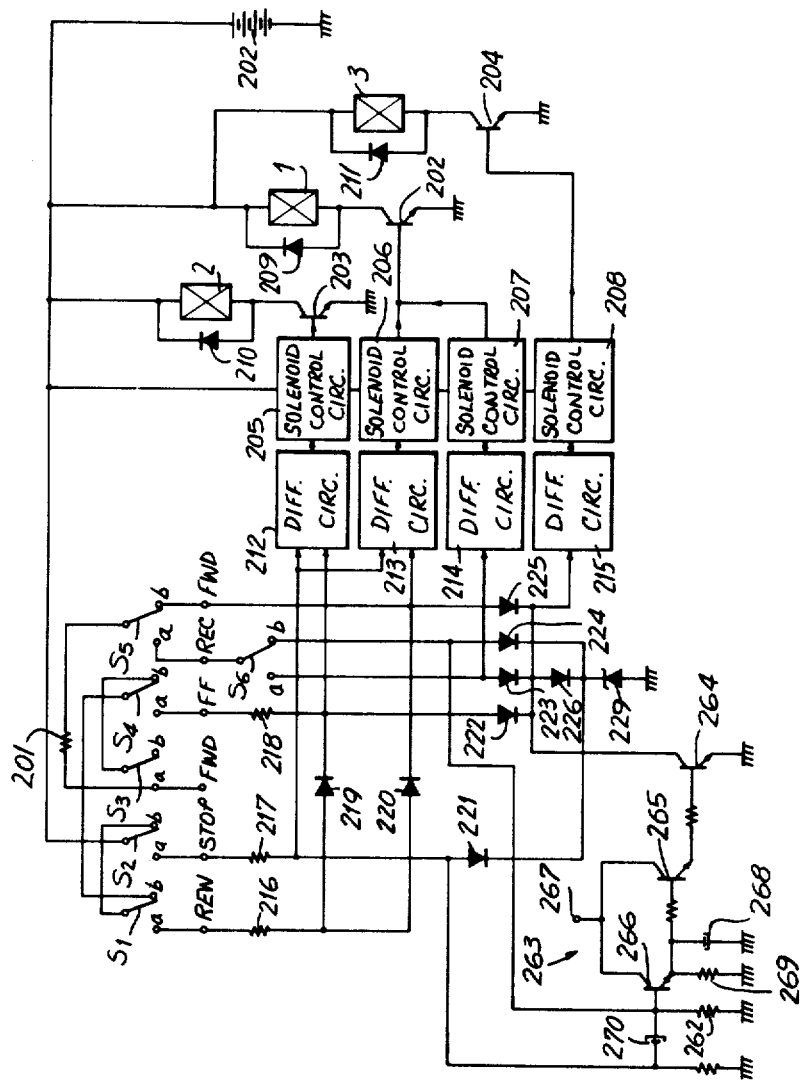

FIG. 16 shows still another electrical circuit for the tape recorder according to this invention and which is effective to prevent the above described misoperation. Further, the electrical circuit of FIG. 16, is particularly designed to ensure that, if the FWD switch $S_3$ and REC switch $S_5$ are actuated for the changing over to the REC mode in the case that the frangible tab is broken or removed from a cassette to prevent inadvertent erasing of previously recorded material, and then the REC switch $S_5$ is released earlier than the FWD switch $S_3$, the tape recorder is not changed over into the FWD mode.

In FIG. 16, parts corresponding to those described with reference to FIG. 13 are identified by the same reference numerals, and switches 90 and 92, motor drive circuit 230 and motor 231 of FIG. 13 have been omitted for simplification of the drawing.

When the frangible tab is broken or removed to prevent inadvertent erasing of the tape cassette, the detecting switch $S_6$ is engaged with its contact b. With the actuation of the switches $S_3$ and $S_5$, the voltage of battery 200 is applied through the stationary contacts b of the switches $S_2$, $S_1$, and $S_4$ to the stationary contact a of switch $S_3$. The voltage at the stationary contact a of switch $S_3$ is divided by resistor 201 through which the voltage is applied to the contact b of detecting switch $S_6$, and by another resistor 262 of a detecting circuit 263 which further includes transistors 264, 265 and 266. The divided voltage from the junction of resistors 201 and 262 is applied to the base of transistor 266 to make the latter conductive. The voltage of battery 200 is applied to a power source terminal 267 of detecting circuit 263 so that, in response to the turning-on of transistor 266, a capacitor 268 is instantaneously charged. The transistor 265 is turned on with the charging voltage of capacitor 268, and transistor 264 connected to transistor 265 is also turned on. As a result, the anode potential of diode 226 becomes nearly the ground potential to mute the voltage to input terminals of differentiating circuits 214 and 215. Accordingly, solenoids 1 and 3 are not energized, and so the tape recorder is not changed over into the REC mode, but rather is maintained in the previously set operating mode.

When the switches $S_3$ and $S_5$ are actuated for initiating change-over to the REC mode, in the case that detecting switch $S_6$ is engaged with its contact b as shown on FIG. 16, and then switch $S_5$ is released before switch $S_3$, transistor 266 is turned off or made non-conductive since no voltage is supplied to the base of transistor 266. The capacitor 268 is gradually discharged to ground through a resistor 269. Accordingly, transistor 265, and therefore also the transistor 264 are gradually made non-conductive, with the result that the anode potential of diode 226 gradually increases. Thus, a gradually increasing voltage is applied to differentiating circuits 214 and 215, and trigger pulses to operate control circuits 207 and 208 cannot be produced by the differentiating circuits 214 and 215. Accordingly, control signals are not obtained from control circuits 207 and 208, and solenoids 1 and 3 are not energized to effect change over of the tape recorder into the FWD mode.

There will now be described the conditions that arise if, at a time when solenoids 1 and 2 are energized due to actuation of switch $S_2$, any of the switches $S_1$, $S_3$, $S_4$ and $S_5$ is actuated.

When solenoids 1 and 2 are energized in response to the actuation of switch $S_2$, the voltage of the battery 200 is also applied through the stationary contact a of the switch $S_2$ and resistor 217 to a capacitor 270 of the detecting circuit 263, and it is differentiated by the capacitor 270. The transistor 266 is instantaneously turned ON by the differentiation pulse from capacitor 270, and, therefore, capacitor 268 is instantaneously charged. The transistor 265 is turned ON by the charging voltage of capacitor 268, and the transistor 264 is turned ON. Thus, the anode potential of diode 226 becomes nearly the ground potential. The capacitor 268 starts being gradually discharged through resistor 269 immediately after being charged. Transistor 264 remains conductive for a time determined by the time constant depending on the capacitance of capacitor 268 and the resistance of resistor 269. Accordingly, even when any of the switches $S_1$, $S_3$, $S_4$ and $S_5$ is actuated during the time determined by such time constant, the voltage is not applied to the differentiating circuits 214 and 215, since the anode of the diode 226 is nearly at the ground potential. Moreover, the change-over operation to STOP mode is carried through to completion and changing over of the tape recorder into the undesired operating mode is prevented.

As above described, when the frangible tab is broken of the tape cassette, the voltage of battery 200 is divided by resistors 201 and 262, and the divided voltage is applied to the base of transistor 266. The level of the divided voltage is lower than the level of the differentiation pulse from capacitor 270, and the divided voltage is directly applied to the base of transistor 266 without differentiation. Accordingly, even when switches $S_3$ and $S_5$ are continuously actuated, the transistor 266 is maintained in the conductive state and, therefore, the plunger solenoids are not energized. Since the level of the divided voltage is lower than the differentiation pulse from capacitor 270, the discharging time of capacitor 268 for the case in which transistor 266 is turned ON by the divided voltage, is shorter than the discharging time of capacitor 268 for the case in which transistor 266 is turned ON by the differentiating pulse. As soon as switches $S_3$ and $S_5$ are released from being actuated, muting of the voltage is eliminated, and the next change-over operation becomes possible.

Figure 17:
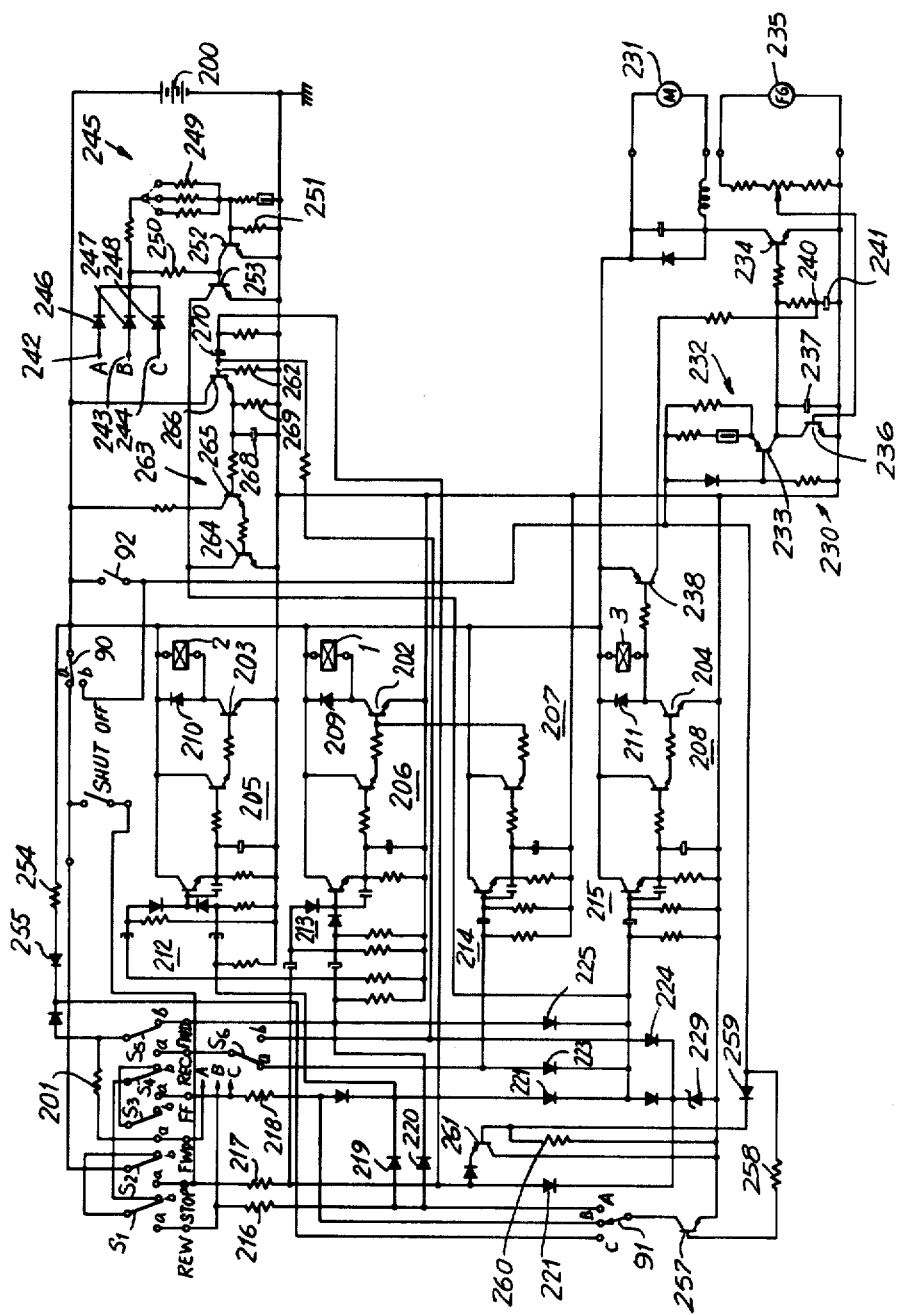

FIG. 17 shows electrical circuits for the tape recorder according to this invention, and which include all of the electrical circuits of FIGS. 13 to 16, with the parts in FIG. 17 which correspond to those described above with reference to FIGS. 13 to 16 being identified by the same reference numerals. It will be appreciated that the various circuit arrangements of FIG. 17 operate in the same manner as has been described above with reference to FIGS. 13 to 16, respectively.

With all of the above described electrical circuits, the motor starts to be driven substantially at the same time as the plunger solenoids are energized, and the motor speed is built up to its standard, constant speed during the mode change operation. Accordingly, the tape recorder can be changed over from one to the other of the desired modes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A mode change-over mechanism for a recording and/or reproducing apparatus having a plurality of modes of operation comprising:

cam means operable each time a change in the operation mode of the apparatus is to be effected;

a slide member adapted to be longitudinally displaced;

spring means urging said slide member in one longitudinal direction to a starting arrested position;

means driven by said cam means for imparting a stroke to said slide member in the other longitudinal direction upon each operation of said cam means;

electro-magnetically operated means for selectively determining at least one additional arrested position of said slide member, each said arrested position corresponding to a respective mode of operation of the apparatus and at which the return movement of said slide member under the urging of said spring means is selectively arrested following the imparting of said stroke to the slide member;

a plurality of mode-establishing members adapted to be individually displaced from inactive to active positions for establishing respective modes of operation of the apparatus;

a mode change-over lever which is angularly positionable for selective engagement with said mode-establishing members in dependence on the position at which said slide member is selectively arrested following said imparting of the stroke thereto; and drive means operable by said cam means for driving said change-over lever and thereby displacing to its active position the mode-establishing member with which said change-over lever is engaged so as to establish the respective mode of operation.

2. A mode change-over mechanism according to claim 1; in which said slide member has at least one laterally opening recess therein; and said electro-magnetically operated means includes a selecting slide for each said recess and which is movable laterally in respect to said slide member between an inoperative position in which said selecting slide is released from the slide member and an operative position in which said selecting slide engages said slide member in the respective recess for arresting said return movement at the respective additional arrested position, and a solenoid for each said selecting slide and being selectively energized for controlling the movements of the respective selecting slide between said operative and inoperative positions thereof.

3. A mode change-over mechanism according to claim 2; in which said cam means includes a rotated drive gear, a cam gear adapted to be driven by said drive gear and having a cam thereon engageable by said means for imparting a stroke to said slide member, stop means engageable with said cam gear for stopping the rotation of the latter by said drive gear, and means controllable by each said solenoid for releasing said stop means from said cam gear.

4. A mode change-over mechanism according to claim 3; in which said slide member has at least another laterally opening recess therein so that (n+1) arrested positions of said slide member corresponding to (n+1) modes of operation of the apparatus are selectively attainable with (n) solenoids, (n) being the number of recesses in said slide member.

5. A mode change-over mechanism according to claim 2; in which each said selecting slide has a spring connected thereto and urging the selecting slide in the direction for engaging the latter in the respective recess, and each said solenoid has an armature and lost-motion connecting means between said armature and the respective selecting slide.

6. A mode change-over mechanism according to claim 2; in which said slide member has an opening therein with an edge of said opening extending obliquely relative to the longitudinal direction of the slide member, and said mode change-over lever has a pin extending therefrom and engaging said edge for angularly positioning the mode change-over lever in dependence on said position at which the slide member is selectively arrested.

7. A mode change-over mechanism according to claim 1; in which said cam means includes a rotated drive gear, a cam gear adapted to be driven by said drive gear and having a cam thereon engageable by said means for imparting a stroke to said slide member, stop means engageable with said cam gear for stopping the rotation of the latter by said drive gear, and means controllable by said electro-magnetically operated means for releasing said stop means from said cam gear.

8. A mode change-over mechanism according to claim 7; in which said cam means further includes a second cam gear adapted to be driven by said drive gear and having a second cam thereon; and in which said drive means includes a drive lever on which said mode change-over lever is mounted to be driven in response to rocking of said drive lever, a portion of said drive lever engages said second cam to rock said drive lever in response to rotation of said second cam gear, additional stop means for stopping the rotation of said second cam gear by said drive gear, and additional electro-magnetically operated means for releasing said additional stop means.

9. A mode change-over mechanism according to claim 8; further comprising locking means operative, when one of said mode-establishing members is displaced to its active position, to retain said one mode-establishing member in said active position thereof.

10. A mode change-over mechanism according to claim 9; in which said locking means is engageable with said drive lever to retain the latter in a rocked position after rocking of the drive lever by said second cam.

11. A mode change-over mechanism according to claim 9; further comprising means for releasing said locking means and thereby permitting return of the previously retained mode-establishing member to its inactive position in response to the imparting of said stroke to said slide member.

12. A mode change-over mechanism according to claim 11; in which said slide member has at least one laterally opening recess therein; said electro-magnetically operated means includes a selecting slide for each said recess and which is movable laterally in respect to said slide member between an inoperative position in which said selecting slide is released from the slide member and an operative position in which said selecting slide engages said slide member in the respective recess for arresting said return movement at the respective additional arrested position, and a solenoid for each said selecting slide and being selectively energized for controlling the movements of the respective selecting slide between said operative and inoperative positions thereof; said stop means includes at least one abutment on the first mentioned cam gear and a pivoted stop member normally urged into the path of said abutment; and said means for releasing the stop means includes an arm on the pivoted stop member acted upon by each said solenoid upon energizing thereof for pivoting said stop member in the direction to withdraw the latter from said path of the abutment.

13. A mode change-over mechanism according to claim 1; in which said slide member has a plurality of laterally opening recesses therein; and said electro-magnetically operated means includes a plurality of selecting slides corresponding to said recesses, respectively, and which are movable laterally in respect to said slide member between inoperative positions in which said selecting slides are released from the slide member and operative positions in which the selecting slides engage said slide member in the respective recesses for arresting said return movement at the respective additional arrested positions, and a plurality of solenoids corresponding to said selecting slides, respectively, and being selectively energized for movement of the respective selecting slides from said operative positions to said inoperative position; and further comprising a plurality of solenoid control circuits operative for energizing at least one of said solenoids for respective different times, means for selectively operating said solenoid control circuits, an additional mode-establishing member adapted to be displaced from an inactive position to an active position for establishing an additional mode of operation of the apparatus, and means responsive to said one solenoid for coupling said additional mode-establishing member with said mode change-over lever when the latter is driven during the energizing of said one solenoid for the longer of said times, whereby to displace said additional mode-establishing member to its active position for obtaining said additional mode of operation.

14. A mode change-over mechanism according to claim 13; in which said means for coupling the additional mode-establishing member with the mode change-over lever includes a pin on said mode change-over lever, a coupling member on said additional mode-establishing member and being normally urged out of the path of movement of said pin on the mode change-over lever upon the driving of the latter, and lever means connected between said one solenoid and said coupling member for moving the latter into said path of the pin on said mode change-over lever in response to energizing of said one solenoid.

15. A mode change-over mechanism according to claim 13; in which the first mentioned modes of operation of the apparatus are the forward, fast-forward, rewind and stop modes and said additional mode of operation is the record mode.

16. A mode change-over mechanism according to claim 1; in which said electro-magnetically operated means includes a plurality of solenoids which are selectively energizeable for determining said modes of operation of the apparatus; and further comprising a source of electrical power, circuit means for selectively energizing said solenoids from said source, and means for preventing the energizing of any of said solenoids when the voltage of said source is less than a predetermined value.

17. A mode change-over mechanism according to claim 1; in which said electro-magnetically operated means includes a plurality of solenoids which are selectively energizeable for determining said modes of operation of the apparatus; and further comprising circuit means for selectively energizing said solenoids including a plurality of selectively actuable switches which, when actuated, cause energizing of respective ones of said solenoids corresponding to respective modes of operation of the apparatus, and means to prevent energization of any one of said solenoids upon actuation of said switches to establish a mode of operation for which the apparatus is already set.

18. A mode change-over mechanism according to claim 1; in which said electro-magnetically operated means includes a plurality of solenoids which are selectively energizeable in various combinations for determining said modes of operation of the apparatus; and further comprising circuit means for selectively energizing said solenoids including a plurality of switches which are selectively actuable to determine said various combinations in which the solenoids are energized, and means to prevent inadvertent energizing of said solenoids in additional undesired combinations when said switches are actuated rapidly in sequence.

19. A mode change-over mechanism according to claim 18; in which one of said modes of operation is determined by the simultaneous actuation of two of said switches, and said circuit means further includes means to prevent establishment of another of said modes of operation when one of said two switches is released before the other of said two switches.

20. A mode change-over mechanism for a recording and reproducing apparatus having a plurality of modes of operation comprising
cam means operable each time a change in the operation mode of the apparatus is to be effected;
a movably supported lever arranged to be moved by said cam means;
spring means urging said lever in one direction to a starting arrested position;
electromagnetically operated means for selectively determining at least one additional arrested position of said lever under the urging of said spring means, each said arrested position corresponding to a respective mode of operation of said apparatus;
a plurality of mode-establishing members adapted to be individually displaced from inactive to active positions for establishing respective modes of operation of the apparatus;
a mode change-over lever which is angularly positionable for selective engagement with said mode-establishing members in dependence on the position of the first-mentioned lever;
drive means operable by said cam means for driving said mode change-over lever and thereby displacing to an active position the mode-establishing member with which said mode changeover lever is engaged; and
a lock lever for locking said mode-establishing member at said active position, said lock lever being moved simultaneously with the movement of the first-mentioned lever by said cam means for resetting said mode-establishing member.

21. A mode change-over mechanism according to claim 20, in which said lock lever locks said mode-establishing member at said active position by operation of said change-over lever.

* * * * *